US010055124B2

(12) United States Patent
Song et al.

(10) Patent No.: US 10,055,124 B2
(45) Date of Patent: Aug. 21, 2018

(54) MOBILE TERMINAL AND DISPLAY OPERATING METHOD THEREOF

(71) Applicant: LG Electronics Inc., Seoul (KR)

(72) Inventors: Yoomee Song, Seoul (KR); Minkyoung Chang, Seoul (KR); Arim Kwon, Seoul (KR); Cheongha Park, Seoul (KR); Kyunghye Seo, Seoul (KR); Jaehwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 15/009,520

(22) Filed: Jan. 28, 2016

(65) Prior Publication Data

US 2016/0357433 A1 Dec. 8, 2016

(30) Foreign Application Priority Data

Jun. 8, 2015 (KR) .................. 10-2015-0080690

(51) Int. Cl.
| | |
|---|---|
| *G06F 3/048* | (2013.01) |
| *G06F 3/0488* | (2013.01) |
| *G06F 3/0481* | (2013.01) |
| *G06F 1/16* | (2006.01) |
| *G06F 1/32* | (2006.01) |

(52) U.S. Cl.
CPC ........ *G06F 3/04886* (2013.01); *G06F 1/1637* (2013.01); *G06F 1/3265* (2013.01); *G06F 3/04817* (2013.01); *G06F 2203/04803* (2013.01); *Y02D 10/153* (2018.01)

(58) Field of Classification Search
CPC ............... G06F 3/04886; G06F 3/0488; G06F 3/04817; G06F 3/0482; G06F 3/04845; G06F 3/0485; G06F 1/1637; G06F 1/3265

See application file for complete search history.

(56) References Cited

U.S. PATENT DOCUMENTS

| | | | | |
|---|---|---|---|---|
| 2003/0078077 | A1* | 4/2003 | Kokubo | H04M 1/0218 455/566 |
| 2003/0169212 | A1* | 9/2003 | Nishihara | G06F 1/1615 345/1.1 |
| 2010/0306718 | A1* | 12/2010 | Shim | G06F 3/04883 715/863 |

(Continued)

FOREIGN PATENT DOCUMENTS

| | | |
|---|---|---|
| KR | 10-2008-0025951 A | 3/2008 |
| KR | 10-2011-0103089 A | 9/2011 |
| KR | 10-2012-0008477 A | 1/2012 |

*Primary Examiner* — William Bashore
*Assistant Examiner* — Gregory A Distefano
(74) *Attorney, Agent, or Firm* — Birch, Stewart, Kolasch & Birch, LLP

(57) ABSTRACT

A mobile terminal including a wireless communication processor configured to provide wireless communication; a display including a main region and an extended region extended from the main region toward at least one side of the main region; and a controller configured to deactivate the main region and the extended region of the display, activate the main region of the display without activating the extended region in response to a knock code being input on the main region of the display, and activate the extended region of the display without activating the main region in response to the knock code being input on extended region of the display.

19 Claims, 32 Drawing Sheets

(56) References Cited

U.S. PATENT DOCUMENTS

| | | | | |
|---|---|---|---|---|
| 2011/0279393 A1* | 11/2011 | Okada | ............... | G06F 1/1626 |
| | | | | 345/173 |
| 2013/0091468 A1 | 4/2013 | Xie | | |
| 2014/0378113 A1* | 12/2014 | Song | ............ | G06F 3/014 |
| | | | | 455/418 |
| 2015/0015511 A1* | 1/2015 | Kwak | ............... | G06F 3/0416 |
| | | | | 345/173 |
| 2015/0095826 A1* | 4/2015 | Ahn | .............. | G06F 3/0488 |
| | | | | 715/769 |

* cited by examiner

[LCD-OFF STATE]  [ACTIVATE EXTENDED REGION]

[LCD-OFF STATE]  [ACTIVATE MAIN REGION]

FIG. 20B
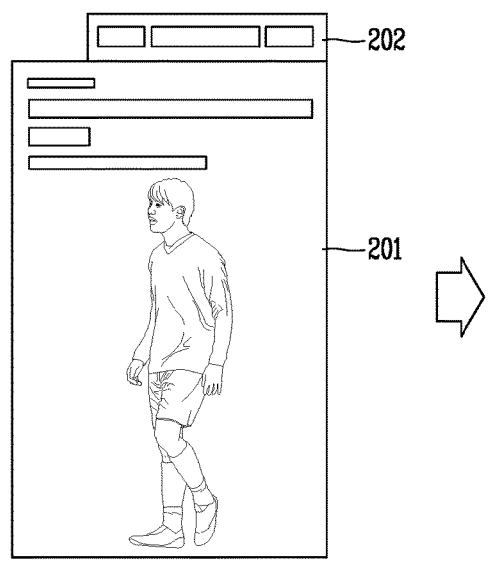
[SENSE INPUT OF HOME KEY]
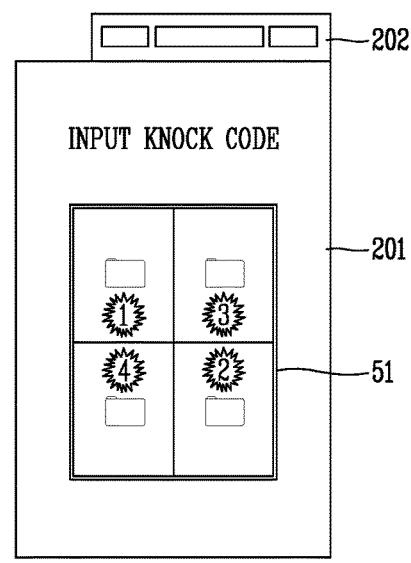
[DISPLAY KNOCK CODE INPUT SCREEN]
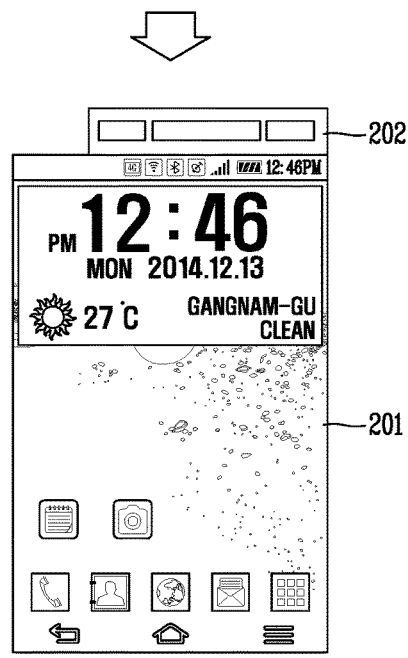
[DISPLAY HOME SCREEN]

FIG. 22A
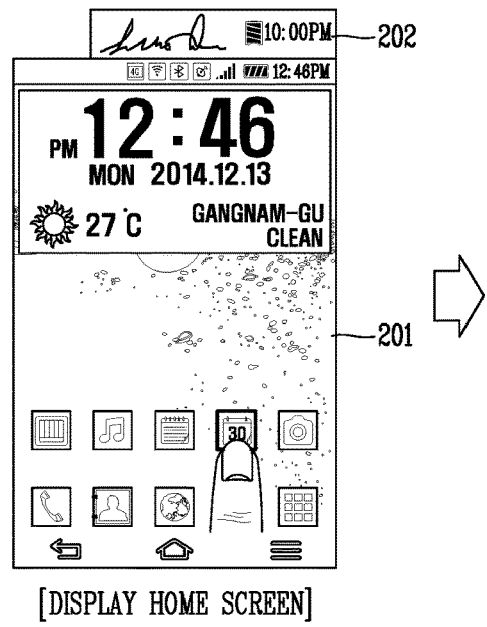
[DISPLAY HOME SCREEN]
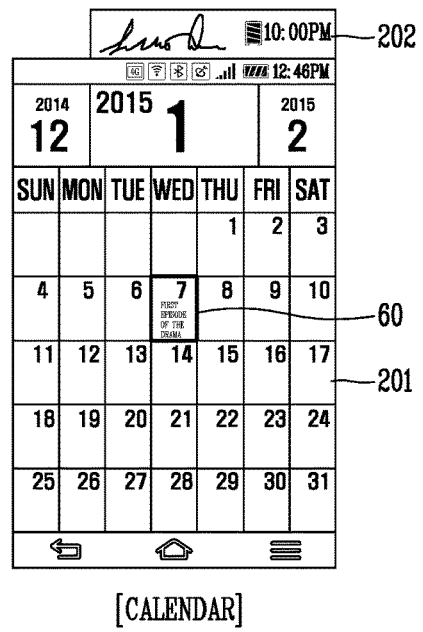
[CALENDAR]
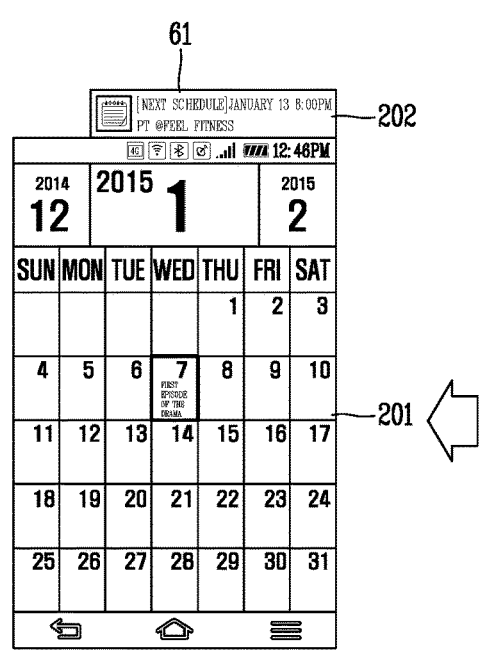
[DISPLAY NEXT SCHEDULE]
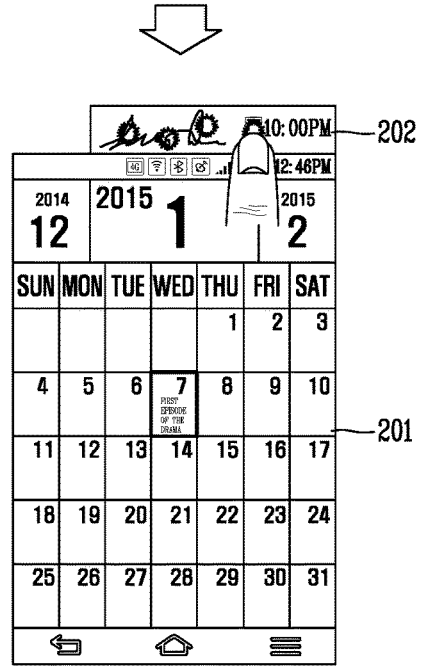
[INPUT KNOCK CODE]

FIG. 22B
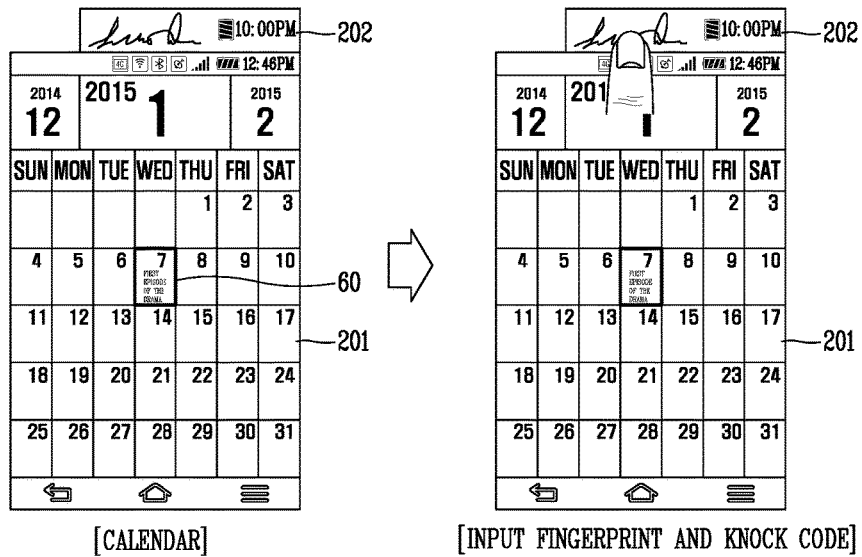
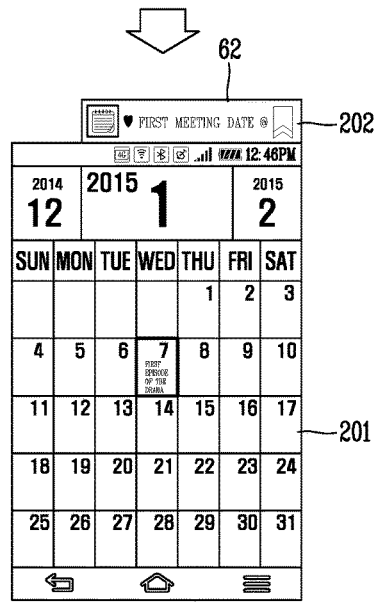

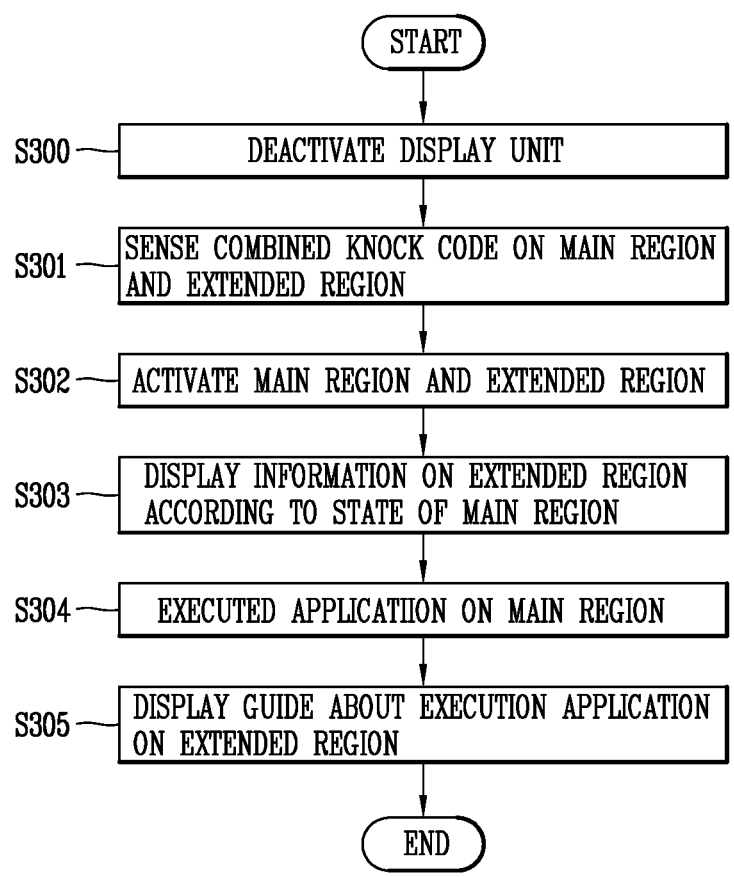

FIG. 24
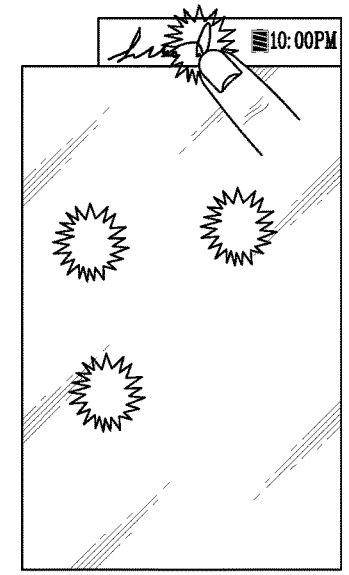
[INPUT COMBINED KNOCK CODE]
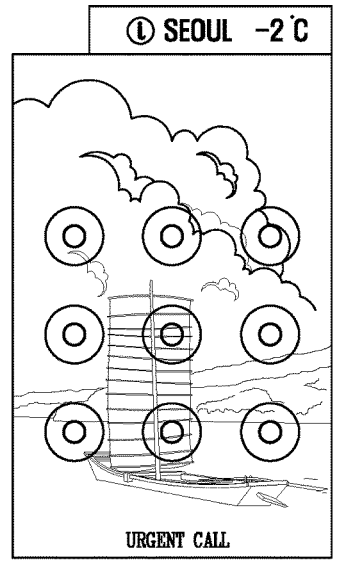
[DISPLAY LOCKED SCREEN]
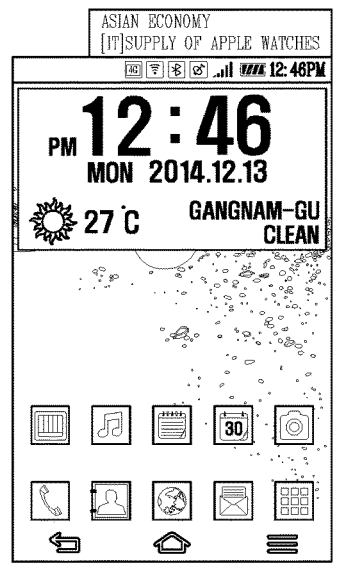
[DISPLAY LOCKED SCREEN]

FIG. 25A
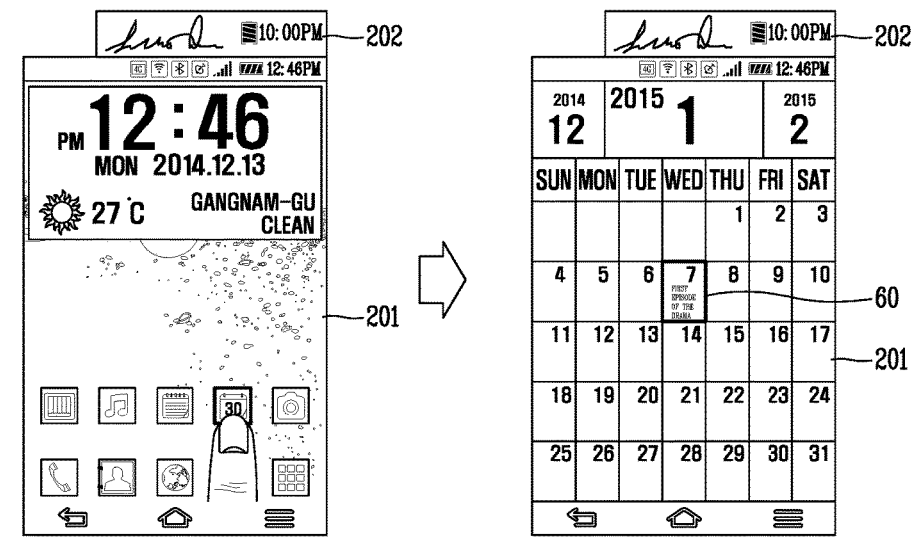
[EXECUTE CALENDAR APPLICATION]
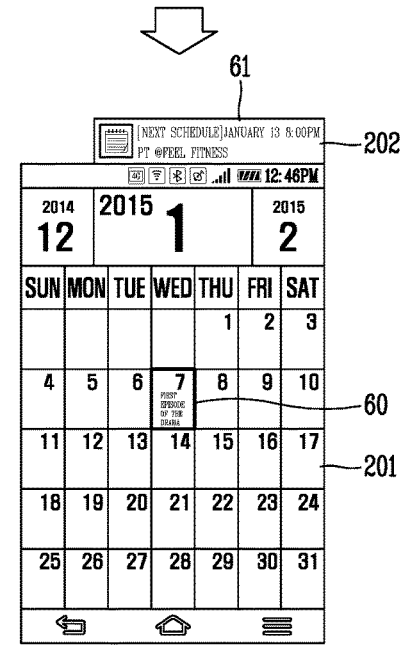

MOBILE TERMINAL AND DISPLAY OPERATING METHOD THEREOF

CROSS-REFERENCE TO RELATED APPLICATION

Pursuant to 35 U.S.C. § 119(a), this application claims the benefit of earlier filing date and right of priority to Korean Application No. 10-2015-0080690, filed on Jun. 8, 2015, the contents of which is incorporated by reference herein in its entirety.

BACKGROUND OF THE INVENTION

1. Field of the Invention

The present invention relates to a mobile terminal, and more particularly, to a mobile terminal selectively activating a partial region on a display unit composed of a main region and an extended region, and a display operating method thereof.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

As the mobile terminal becomes multi-functional, the size of a display unit is increased and picture quality is enhanced to have a high resolution. This may cause significant power consumption in driving the display unit of the mobile terminal. Generally, when the display unit is activated, an entire screen is activated. This results in almost constant power being consumed. Further, the longer the display unit is in an activated state, the more power consumption of a battery is increased.

SUMMARY OF THE INVENTION

Therefore, an aspect of the detailed description is to provide a mobile terminal capable of reducing power consumption by independently activating part of a display unit, and a display operating method thereof.

Another object of the present invention is to provide a mobile terminal capable of operating a display unit by selectively activating a partial region on the display unit composed of a main region and an extended region, and a display operating method thereof.

To achieve these and other advantages and in accordance with the purpose of the present invention, as embodied and broadly described herein, there is provided a mobile terminal, including: a display unit composed of a main region, and an extended region extended from the main region toward at least one side of the main region; and a controller configured to selectively activate the main region and the extended region, based on an input position on the display unit.

To achieve these and other advantages and in accordance with the purpose of the present invention, as embodied and broadly described herein, there is also provided a display operating method of a mobile terminal, including: deactivating a display unit composed of a main region and an extended region; sensing input of a knock code to the display unit; determining a region on the display unit where the knock code has been input; and selectively activating the main region and the extended region based on the determined region.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 20A and 20B are views illustrating an embodiment to search for content set with privacy information according to an embodiment of the present invention;

FIGS. 22A and 22B are views illustrating an embodiment to provide information related to an application executed on a main screen, to a supplementary screen;

FIG. 23 is a flowchart illustrating an operation to enter a helper mode by activating a main region and an extended region, through combination of knock codes;

FIG. 24 is a view illustrating an embodiment to provide information to an extended region, according to a state of a main region in a helper mode;

FIGS. 25A to 25D are views illustrating an embodiment to provide information to an extended region, according to an application executed on a main region in a helper mode.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
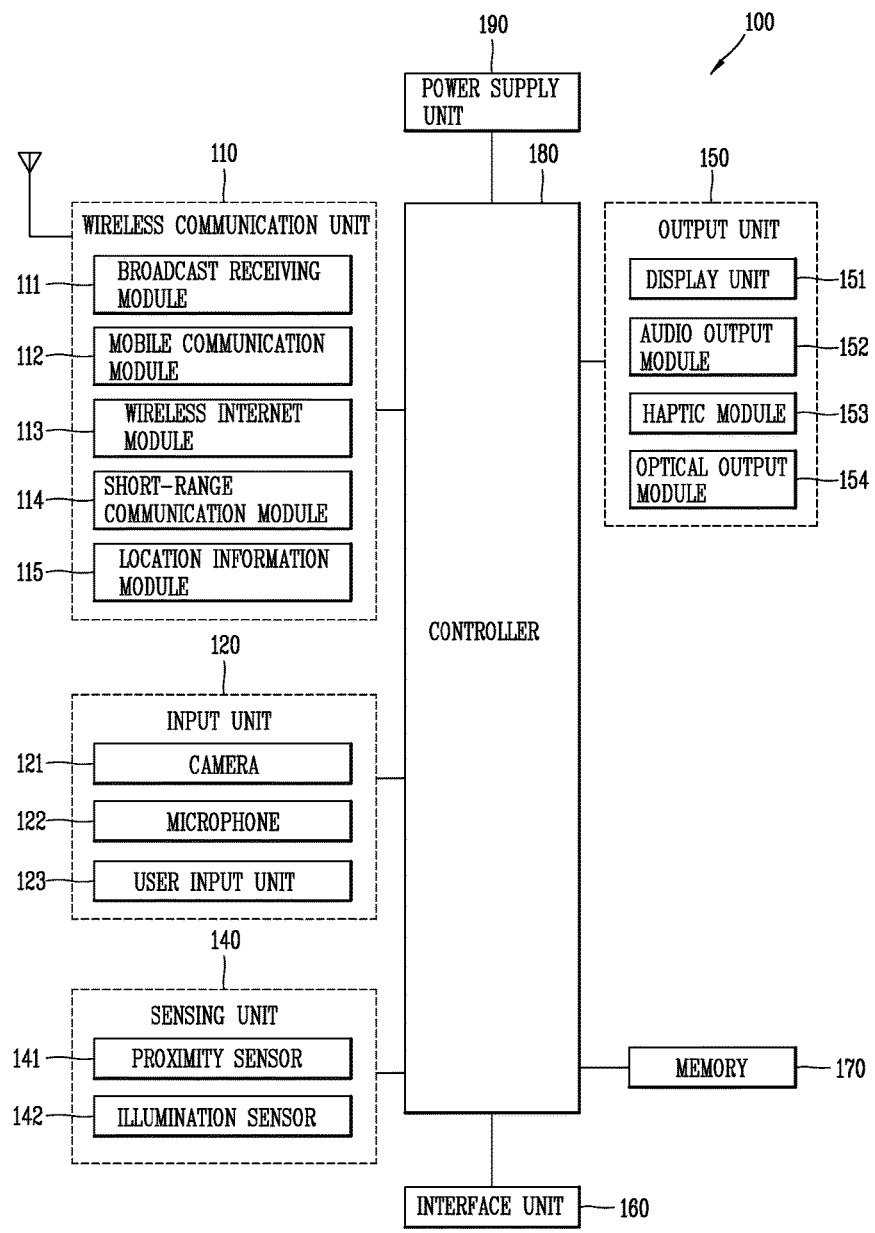
FIG. 1A is a block diagram of a mobile terminal in accordance with the present disclosure.
Figure 1B:
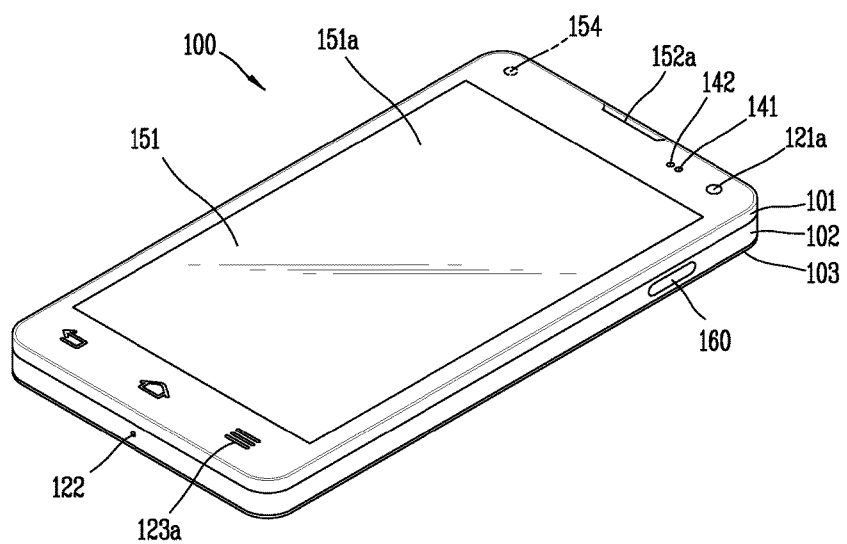
FIGS. 1B and 1C are conceptual views of one example of the mobile terminal, viewed from different directions.
Figure 1C:
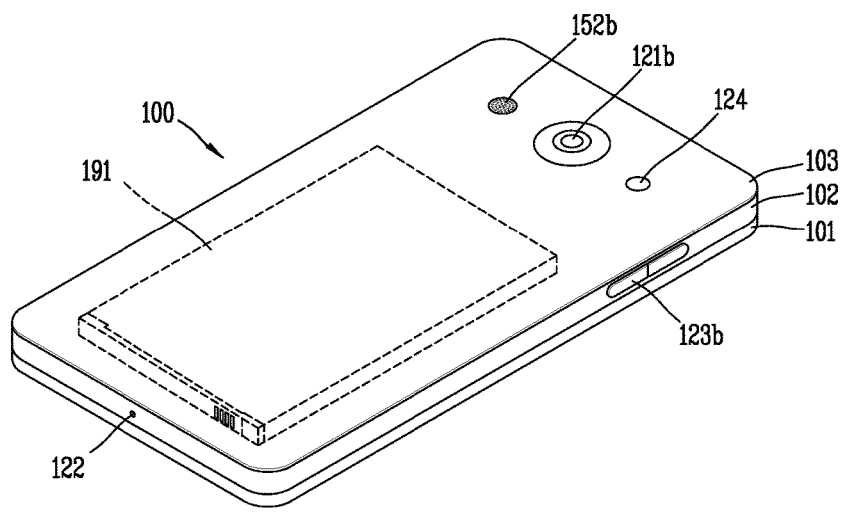

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150, configured to generate an output in a visible, audible or tactile manner, may include at least one of a display unit 151, an audio output unit 152, a haptic module 153 and an optical output unit 154. The display unit 151 may have a layered structure with a touch sensor, or may be integrally formed with a touch sensor, thereby implementing a touch screen. The touch screen may serve as the user input unit 123 for providing an input interface between the mobile terminal 100 and a user, or may provide an output interface between the mobile terminal 100 and a user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen.

In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
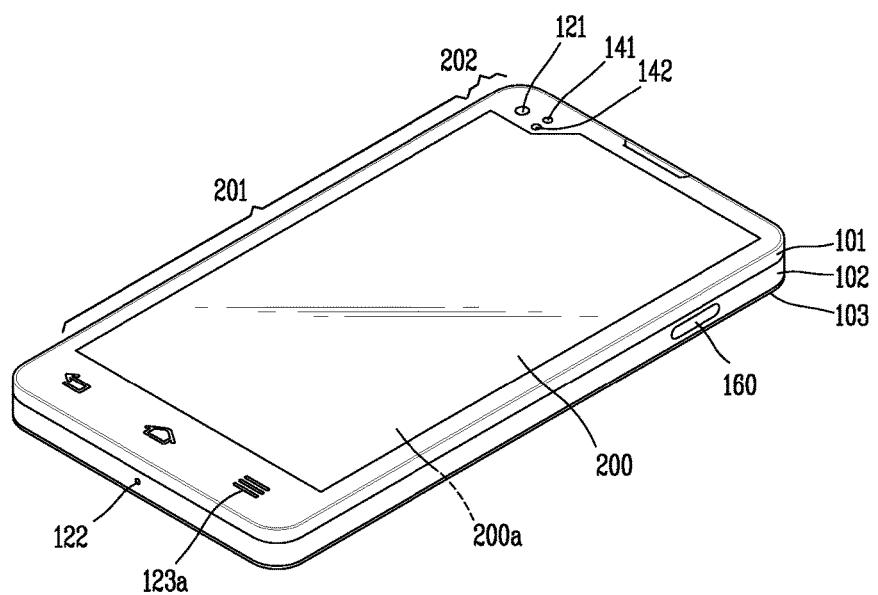
FIG. 2 is a conceptual view of a mobile terminal according to an embodiment of the present invention, which is viewed from a front surface.

FIG. 2 is a conceptual view of a mobile terminal according to an embodiment of the present invention, which is viewed from a front surface. As shown in FIG. 2, the mobile terminal includes one or more display regions independently activated within a single display unit (or display panel). The one or more display regions form a window 200a. The display unit 200 which is partially activated/deactivated, is differentiated from the display unit 151 which is entirely activated/deactivated.

That is, the display unit 200 has a structure where one side of the display unit 151 shown in FIG. 1B is extended to a predetermined direction, e.g., an upper side. FIG. 2 illustrates that one side of the display unit 151 is extended to an upper side, for convenience. However, the present invention is not limited to this. That is, one side of the display unit 151 may be extended to a lower side, a right side, a left side or a lateral surface of the display unit 151, and an upper surface or a bottom surface of the mobile terminal.

A first region 201 of the display unit 200 is a main region, which corresponds to the display unit 151 of FIG. 1B. And a second region 202 of the display unit 200 is an extended region. The two regions 201, 202 may be independently controlled by the controller 180. The extended region 202 is different from the main region 201 in shape and size. Thus, in the present invention, one of the two regions 201, 202 is selectively activated to reduce power consumption.

General image information is displayed on the main region 201, and an occurred event or a status bar may be displayed on the extended region 202. Additional information may be displayed on the extended region 202, based on a type of an application displayed on the main region 201. When the main region 201 is in a deactivated state ('off' state), status information may be displayed on the extended region. On the contrary, when the main region 201 is in an activated state ('on' state), the status information is displayed on an upper part of the main region.

When a user does not use the mobile terminal, the main region 201 may be deactivated and the extended region 202 may be activated. In this instance, the user can check a state of the mobile terminal or a newly-occurred event through the extended region 202. As shown, the extended region 202 may be formed to be smaller than or equal to the main region 201, in horizontal or vertical length. In the present invention, a horizontal length of the extended region 202 is shorter than a horizontal length of the main region 201. In this instance, the camera 121, the proximity sensor 141, the illumination sensor 142, which have been positioned on a bezel portion at an upper side of the display unit 151, may be disposed on the left side of the extended region 202, as shown in FIG. 2.

When the horizontal length of the extended region 202 is shorter than the horizontal length of the main region 201, at least one side of the display unit may have a rectangular shape, an inclined surface and a curved surface. FIG. 3 illustrates that the one side of the display unit has an inclined surface.

The display unit 200, a display panel, is largely divided into a liquid crystal panel and a backlight unit. The backlight unit serves to evenly distribute light provided from an optical source, to a front surface of the display unit, and includes an optical source, a light guiding plate, a polarizing plate, a diffusion plate and a reflector.

Figure 3A:
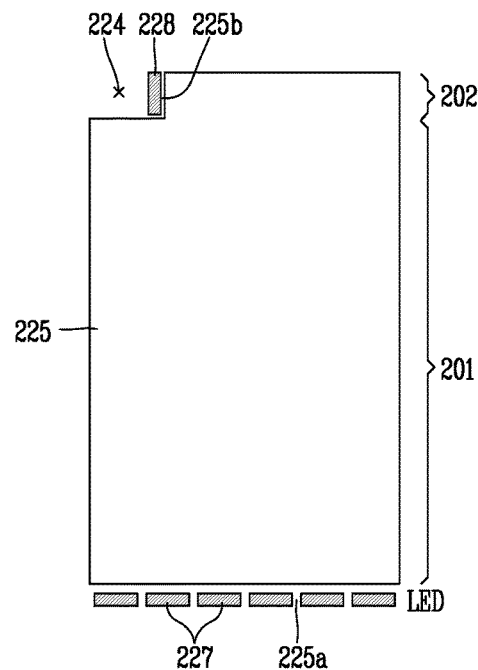
FIGS. 3A and 3B are frontal views illustrating a light guiding plate and an optical source which constitute a display unit according to an embodiment of the present invention.
Figure 3B:
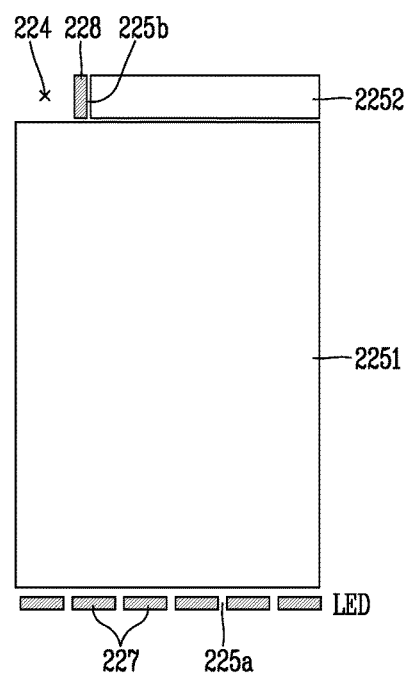

Next, FIGS. 3A and 3B are frontal views illustrating a light guiding plate and an optical source which constitute the display unit 200 according to an embodiment of the present invention. As shown in FIG. 3A, optical sources 227, 228 are disposed on a side surface of a light guiding plate 225, and provide light to the side surface of the light guiding plate 225. The light guiding plate 225 diffuses light supplied from the optical sources 227, 228 therein, using a total reflection principle. The total reflection means that light incident with an incidence angle smaller than a threshold angle is irradiated in the light guiding plate 225. Light incident onto the side surface of the light guiding plate 225, with an incidence angle more than a threshold angle, is totally reflected and diffused in the light guiding plate 225. If the light is bent with an angle smaller than a threshold angle, the light is irradiated from the light guiding plate 225. FIG. 3A illustrates the main optical sources 227, the supplementary optical source 228, and the light guiding plate 225.

Unlike the related art backlight unit, the backlight unit 220 of the present invention is configured to provide light to the light guiding plate 225 through optical sources disposed in two directions. For instance, the plurality of main optical sources 227 disposed in parallel along a first side surface 225a of the light guiding plate 225 can evenly supply light onto an entire region of the light guiding plate 225.

The supplementary optical source 228 disposed on a second side surface 225b perpendicular to the first side surface 225a of the light guiding plate 225 can supply light to a partial region of the light guiding plate 225. In addition, the main optical sources 227 and the supplementary optical source 228 are independently operated. With such a configuration, when the main optical sources 227 are turned off, only the supplementary optical source 228 may be turned on.

Figure 4:
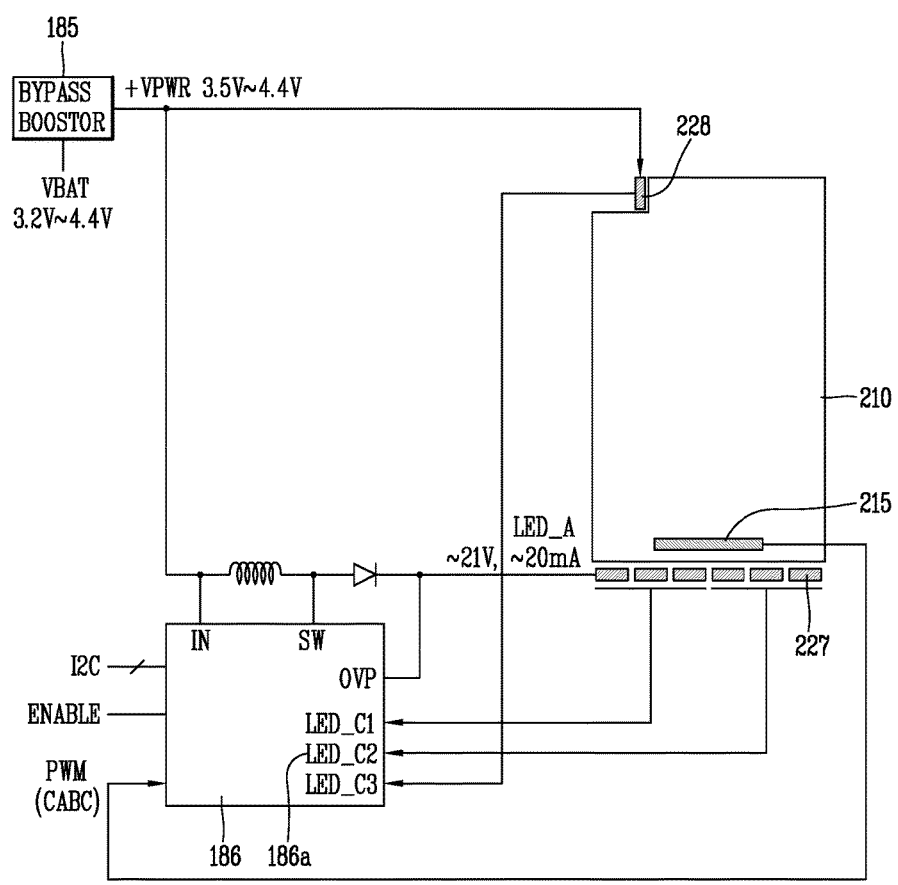
FIGS. 4 and 5 are IC circuits for controlling main optical sources and a supplementary optical source.
Figure 5:
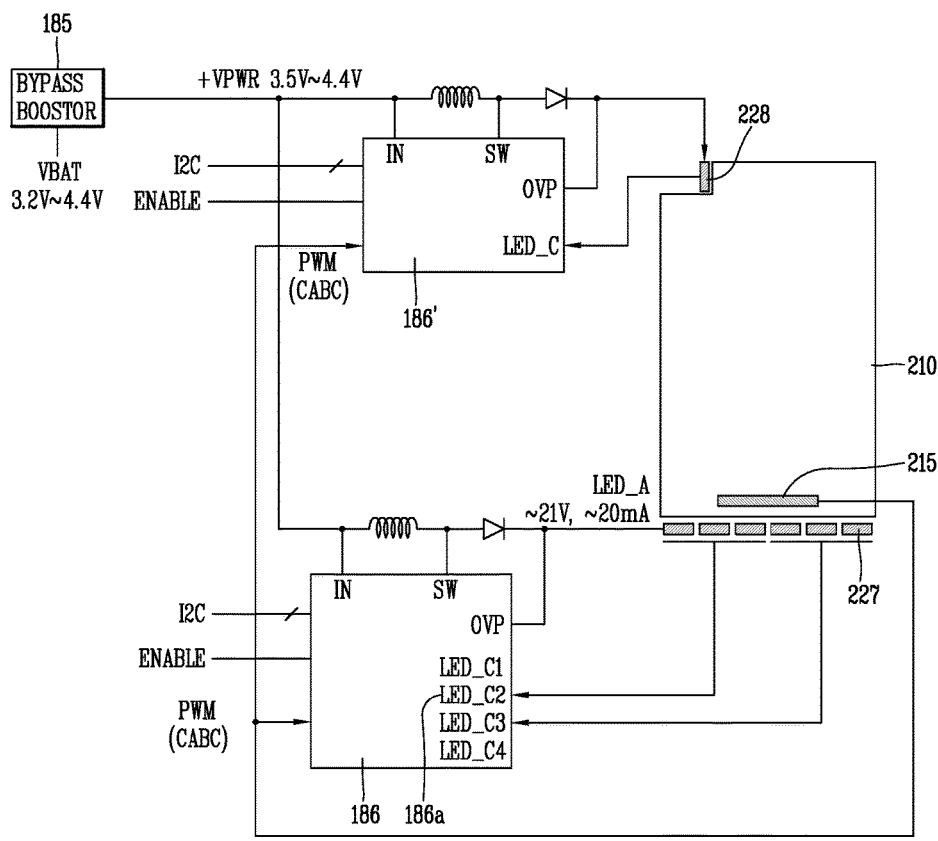

Further, the FIGS. 4 and 5 are IC circuits for controlling the main optical sources 227 and the supplementary optical source 228. Referring to FIG. 4, a single backlight IC 186 controls the main optical sources 227 and the supplementary optical source 228. Referring to FIG. 5, two backlight ICs 186 and 186' control the main optical sources 227 and the supplementary optical source 228, respectively.

Power (VBAT) supplied from the power supply unit 190 has noise removed therefrom through a bypass booster 187. Then, the power is delivered to the backlight IC 186, which controls light to be irradiated from the optical sources 227, 228. Further, the backlight IC 186 searches for an optimum backlight brightness for displaying an image, based on low data information of the image received from a driving IC 215 of a liquid crystal panel, thereby controlling the brightness of each LED (CABC: Content Adaptive Brightness Control).

When using the single backlight IC 186, an LED channel 186a may be used to control the supplementary optical source 228 (refer to FIG. 4). In addition, an additional backlight IC 186' can be further provided to separately control the supplementary optical source 228 (refer to FIG. 5).

The main optical sources 227 are provided in plurality in parallel, close to the first side surface 225a, and supply light to an entire region of the light guiding plate 225. On the contrary, the supplementary optical source 228 is provided in one or two, with a smaller number than the main optical sources 227, and supplies light to a partial region of the light guiding plate 225.

In another embodiment of the present invention, as shown in FIG. 3B, the light guiding plate 225 may include a first light guiding plate 2251 configured to irradiate light supplied from the main optical sources 227 to a front surface of the display unit 200, and a second light guiding plate 2252 configured to irradiate light supplied from the supplementary optical source 228 to a front surface of the display unit 200.

When the light guiding plate 225 is implemented as an integral type as shown in FIG. 3A, the main optical sources 227 can supply light not only to the first region 201 (main region), but also to the second region 202 (extended region). With such a configuration, when the main optical sources 227 are turned on, the supplementary optical source 228 needs not be turned on. Further, a single image can be displayed on the second region 202 and the first region 201.

When the light guiding plate 225 is implemented as a separated type as shown in FIG. 3B, the main optical sources 227 supply light only to the first region 201 through the first light guiding plate 2251, and the supplementary optical source 228 supplies light only to the second region 202 through the second light guiding plate 2252. In order to output information to the second region 202 even in an 'on' state of the main optical sources 227, the supplementary optical source 228 are driven. However, when displaying information only on the second region 202, light is not supplied to the first region 201. This allows the mobile terminal to provide an image of high brightness, using a small number of optical sources (LED lamps).

In addition, the main optical sources 227 and the supplementary optical source 228 are connected to a main board by being integrated with each other or in a separated manner. Thus, in an embodiment of the present invention, independent control of the main region 201 and the extended region 202 corresponds to independent control of the main region 201 and the extended region 202 by the controller 180.

Further, because the supplementary optical source 228 is positioned on the second side surface 225b, a bezel portion on the second side surface 225b can be increased in size. For a large display unit, the increased size of the bezel portion due to the supplementary optical source 228 is not greatly influential on an entire size of the mobile terminal. However, for a mobile terminal having a small size display, the size of the bezel portion is particularly relevant to determine an entire size of the product.

Further, in order to prevent increase of the size of the bezel portion in a side direction, a dent 224 can be formed by concavely forming the second side surface 225b of the light guiding plate 225 where the supplementary optical source 228 is positioned. An increase in the size of the bezel portion in a side direction can be prevented by positioning the supplementary optical source 228 at the dent 224.

In addition, a liquid crystal panel 210 of the display unit 200 has a similar size to the light guiding plate 225. That is, when the dent 224 is provided at the light guiding plate 225, the dent 224 is formed on the same position as the liquid crystal panel 210. Further, the light guiding plate 225 may be divided into a part corresponding to the main region 201, and a part corresponding to the extended region 202. However, the liquid crystal panel 210 is configured as a single body and controlled by a single driving IC. Also, the driving IC is connected to a main board through a flexible board, and applies power to each pixel according to an image signal received from the main board, thereby controlling alignment of liquid crystal.

In addition, the liquid crystal panel can form images by outputting a different color corresponding to each pixel, after changing an aligned state of liquid crystal by selectively applying power to pixels. As shown in FIG. 2, the display unit 200 composed of the liquid crystal panel and the backlight unit may be disposed on a front surface of the mobile terminal 100, thereby outputting information under control of the controller 180.

Figure 6:
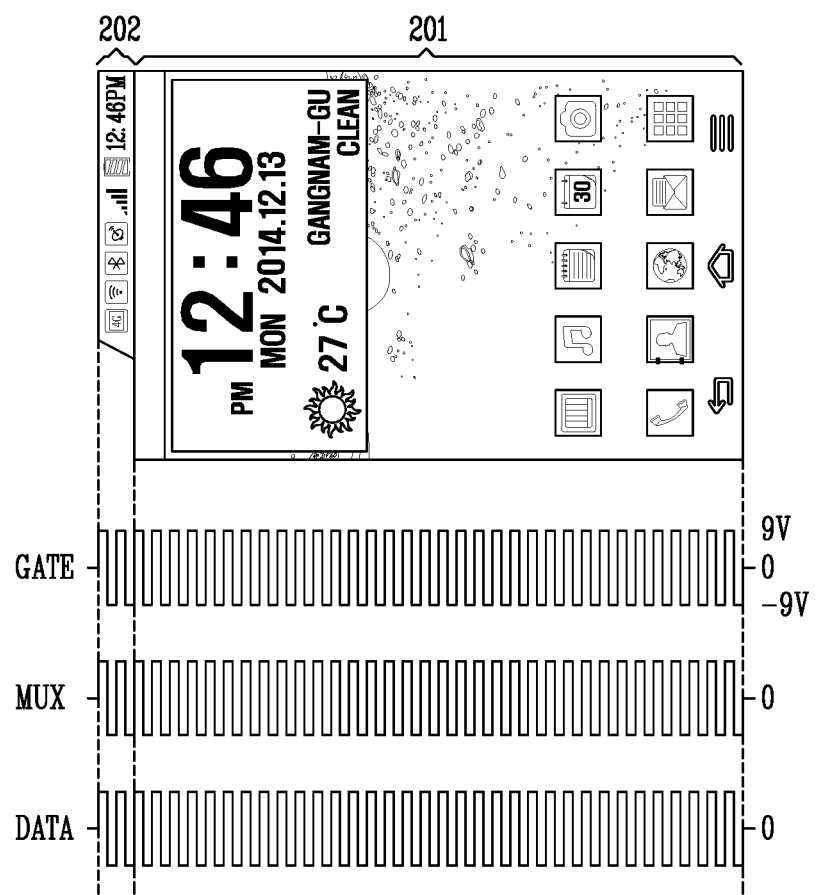
FIGS. 6 and 7 are views illustrating waveforms of signals applied to a liquid crystal panel of a mobile terminal according to an embodiment of the present invention.
Figure 7:
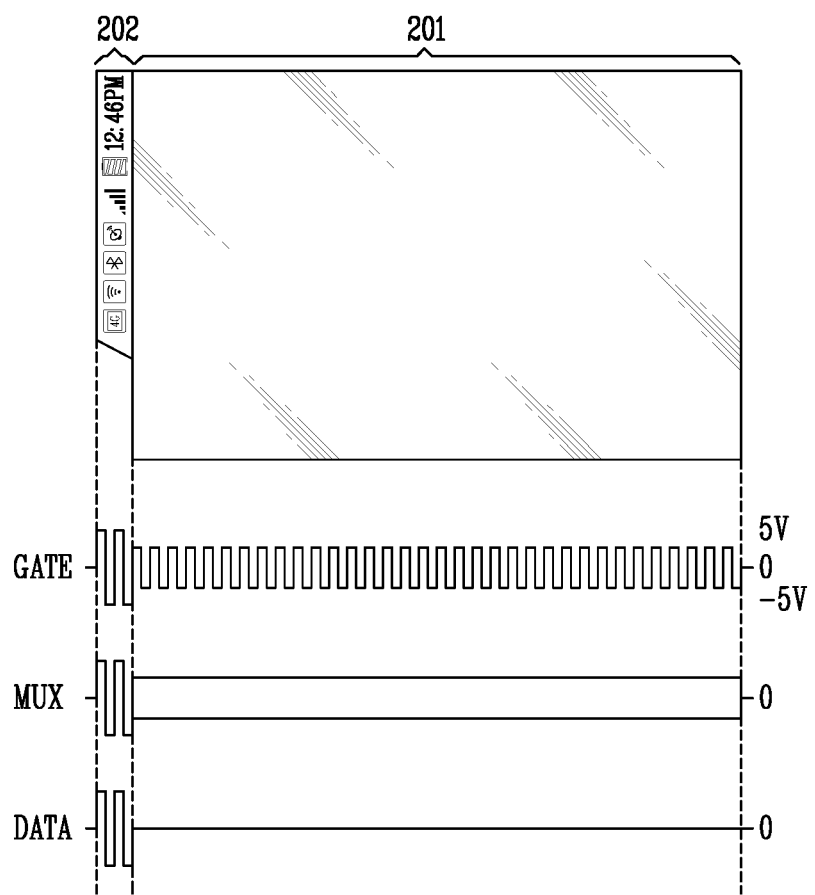

Next, FIGS. 6 and 7 are views illustrating waveforms of signals applied to the liquid crystal panel of the mobile terminal according to an embodiment of the present invention. In on embodiment of the present invention, an operation mode is defined according to a driving type of the main region 201 and the extended region 202. In particular, a first mode indicates both the main region 201 and the extended region 202 being activated, and a second mode indicates only the extended mode 202 being activated.

As shown in FIG. 6, in the first mode, the driving IC transmits a gate signal (GATE), a multiplexer signal (MUX) and a data signal (DATA) to the liquid crystal panel, in order to activate both the main region 201 and the extended region 202. Further, the gate signal determines a threshold voltage of a thin film transistor (FET) of each pixel. Thus, a data voltage more than a gate voltage is applied such that an aligned state of liquid crystal is changed to output images.

In addition, the multiplexer is disposed between the driving IC and each transistor. A gate signal (GATE) and a data signal are transmitted through the multiplexer, and the transmitted signals (GATE, DATA) are sequentially re-distributed to be supplied to each transistor. Further, the gate signal is composed of a gate clock and a shift-resistor, and the shift-resistor serves to transmit data received from the gate clock to a next gate. The data signal is a signal for driving the liquid crystal panel according to color information of each pixel. Also, the data signal is applied with a larger voltage than the gate signal, at a region where an aligned state of liquid crystal is changed, so light supplied from the backlight unit passes through a front surface of the mobile terminal.

As shown in FIG. 7, in the second mode, the driving IC transmits a gate signal (GATE), a multiplexer signal (MUX) and a data signal (DATA) to the liquid crystal panel, in order to activate only the extended region 202. For synchronization, the gate signal (GATE) is also applied to the main region 201 at predetermined time periods. However, since no data signal is applied to the main region 201, the gate signal can be set to have a small size. For instance, a gate signal of ±9V may be applied to the extended region 202 where an aligned state of liquid crystal is changed according to a data signal, and a gate signal of ±5V may be applied to the main region 201.

Thus, embodiments of present invention provide a method for interworking content displayed on the main region and the extended region with each other, by selectively activating the main region (screen) and the extended region (screen) of the display unit 200 which is in a deactivated state ('off' state). Further, a touch input for activating the main region and the extended region corresponds to consecutively knocking a predetermined region within a reference time, which is called 'knock code' in an embodiment of the present invention. The knock code is an exclusive code for selectively activating the main region and the extended region.

In addition, a user can activate a touch sensor of the main region or the extended region by applying a predetermined touch input (e.g., short touch input) before inputting a knock code. Upon input of the knock code, the controller 180 can turn on the liquid crystal panel (e.g., LCD) of the main region or the extended region where the knock code has been input, and release a screen locked state by comparing the input knock code with a preset knock code.

Figure 8:
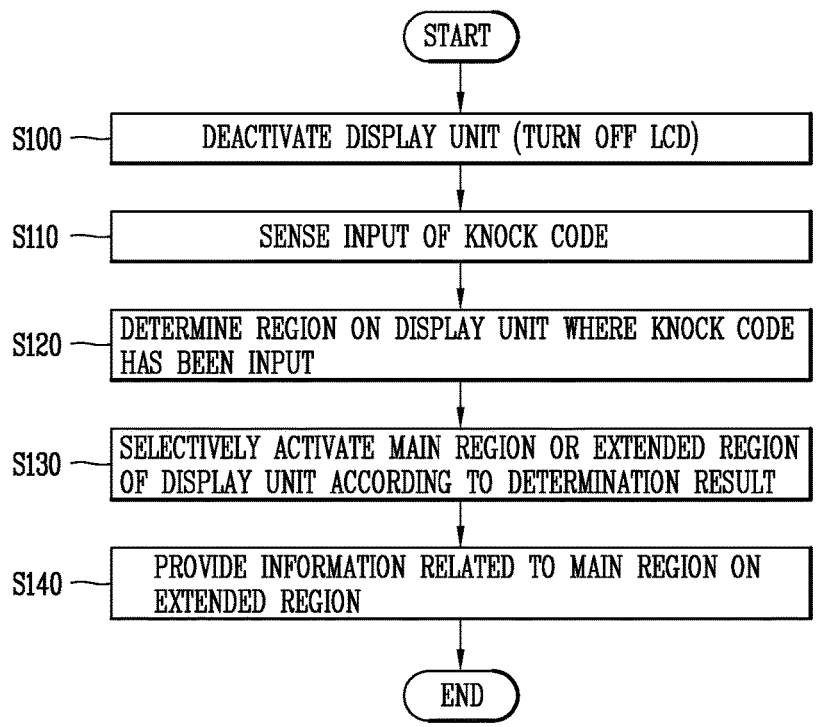
FIG. 8 is a flowchart illustrating a method for operating a display unit by selectively activating a partial region of the display unit, in a mobile terminal according to an embodiment of the present invention.

FIG. 8 is a flowchart illustrating a method for operating the display unit by selectively activating a partial region of the display unit, in the mobile terminal according to an embodiment of the present invention. As shown in FIG. 8, if a user's input has not been applied for a predetermined time, the controller 180 maintains a deactivated state of the display unit 200 by turning off the LCD of the display unit 200 (S100). Upon detection of input of a knock code to the display unit 200 (S110), the controller 180 determines one of the main region and the extended region where the knock code has been input (S120).

Then, the controller 180 selectively activates the main region and the extended region according to a determination result (S130). The extended region is different from the main region in size and shape. For instance, if a knock code is input to the main region, the controller 180 activates only the main region. On the contrary, if a knock code is input to the extended region, the controller 180 activates only the extended region.

If a knock code is input to both the main region and the extended region, the controller 180 activates both the main region and the extended region. Then, the controller 180 checks simple information (occurrence of an event) or executes a simple function (e.g., camera function, headline check) through the activated extended region, and provides information related to the main region (S140).

FIGS. 9A to 9D are views illustrating an embodiment to selectively activate a partial region of the display unit, using a knock code. If a user's input has not been applied for a predetermined time, the controller 180 turns off the liquid crystal panel (hereinafter, will be referred to as 'LCD') for reduction of battery consumption, thereby deactivating the display unit 200 (LCD 'off' state).

In the LCD 'off' state, a user can enter the following mode by selectively activating (waking-up) the main region 201 and the extended region 202 by inputting a knock code.

Figure 9A:
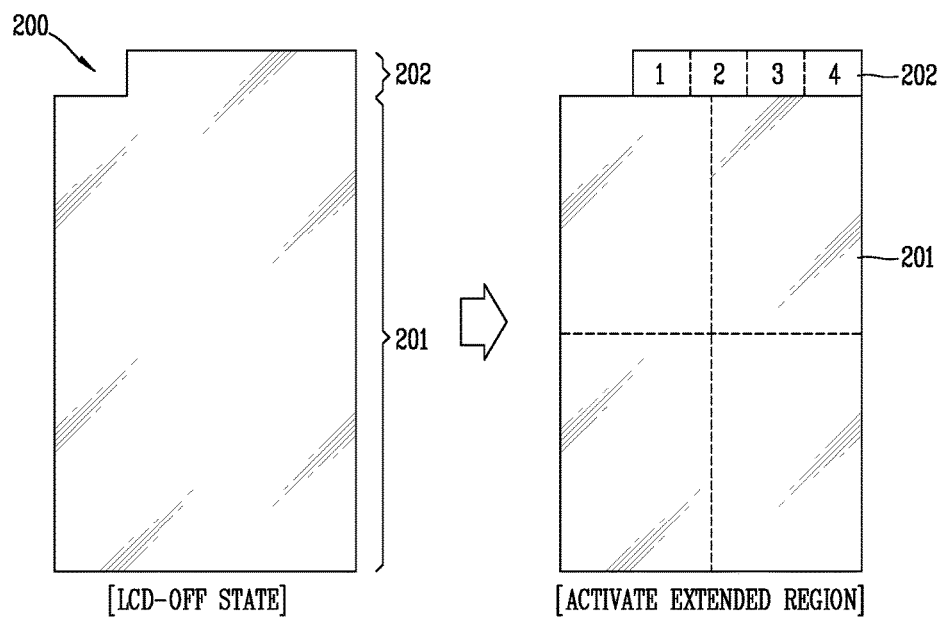
FIGS. 9A to 9D are views illustrating an embodiment to selectively activate a partial region of a display unit, using a knock code.
Figure 9B:
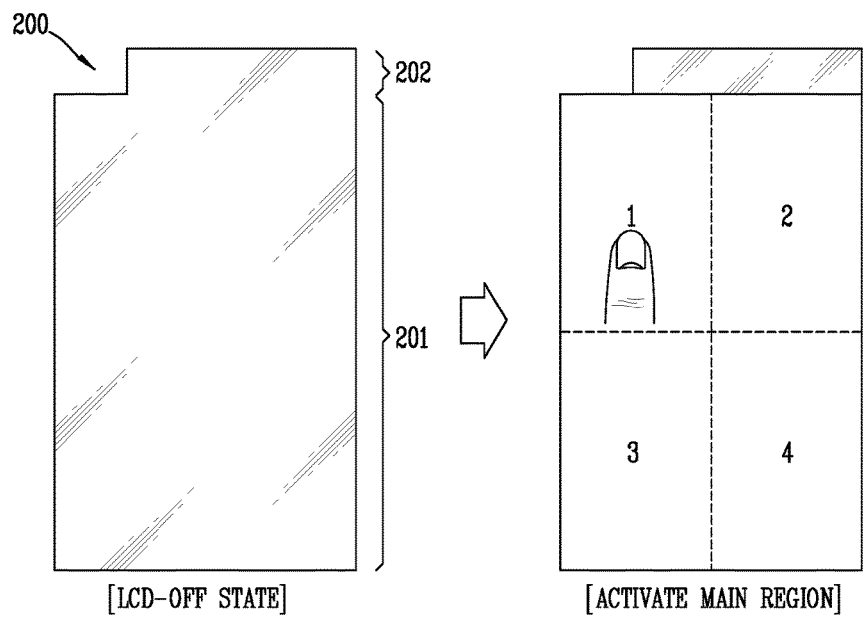
Figure 9C:
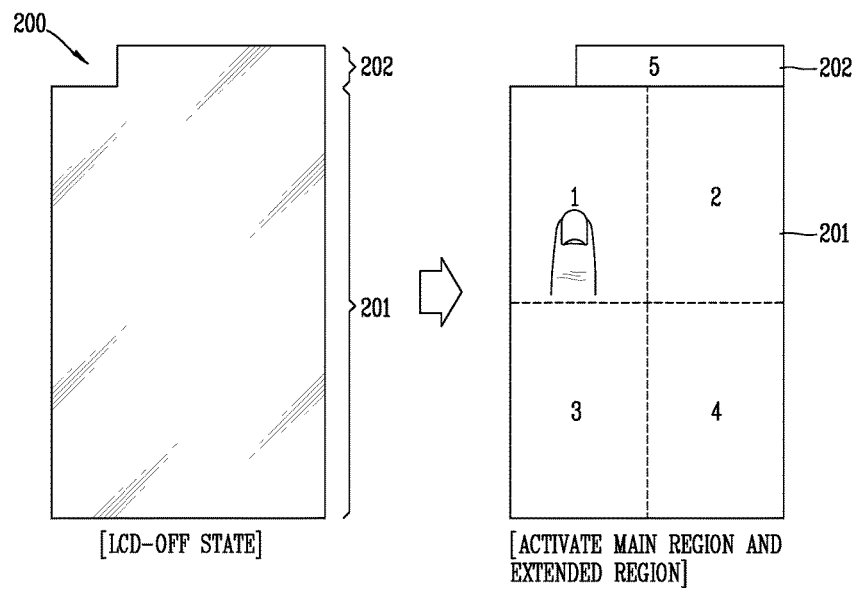

Activation of main region: General mode
Activation of extended region: Convenient mode
Activation of main region and extended region: Helper mode As shown in FIG. 9A, a user can activate the extended region 202 by inputting a knock code to the extended region 202 of the display unit 200. As shown in FIG. 9B, a user can activate the main region 201 by inputting a knock code to the main region 201 of the display unit 200. As shown in FIG. 9C, a user can activate both the main region 201 and the extended region 202 by inputting a knock code (e.g., '12345') to both the main region 201 and the extended region 202 of the display unit 200.

Figure 9D:
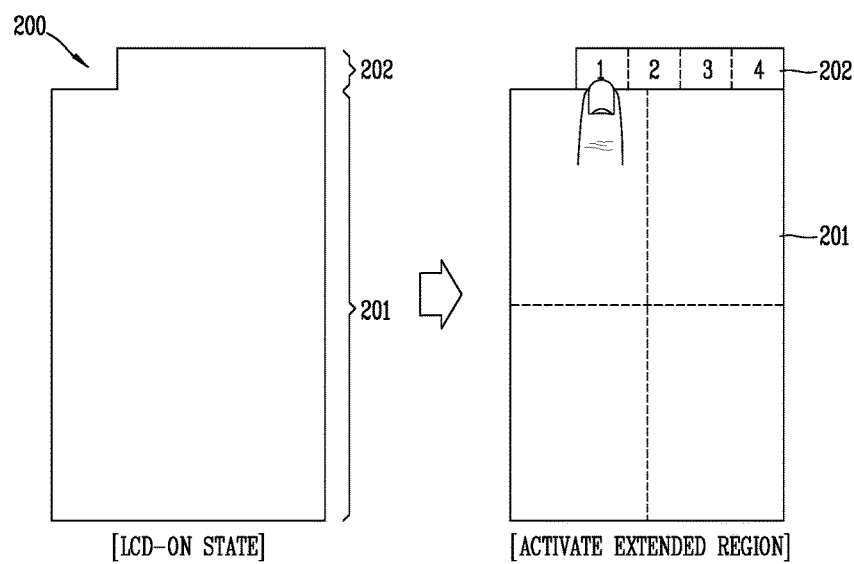

As shown in FIG. 9D, if a knock code is input to the extended region 202 while the mobile terminal is being used, the controller 180 can display secondary information on the extended region 202, based on information being displayed on the extended region 202.

Figure 10:
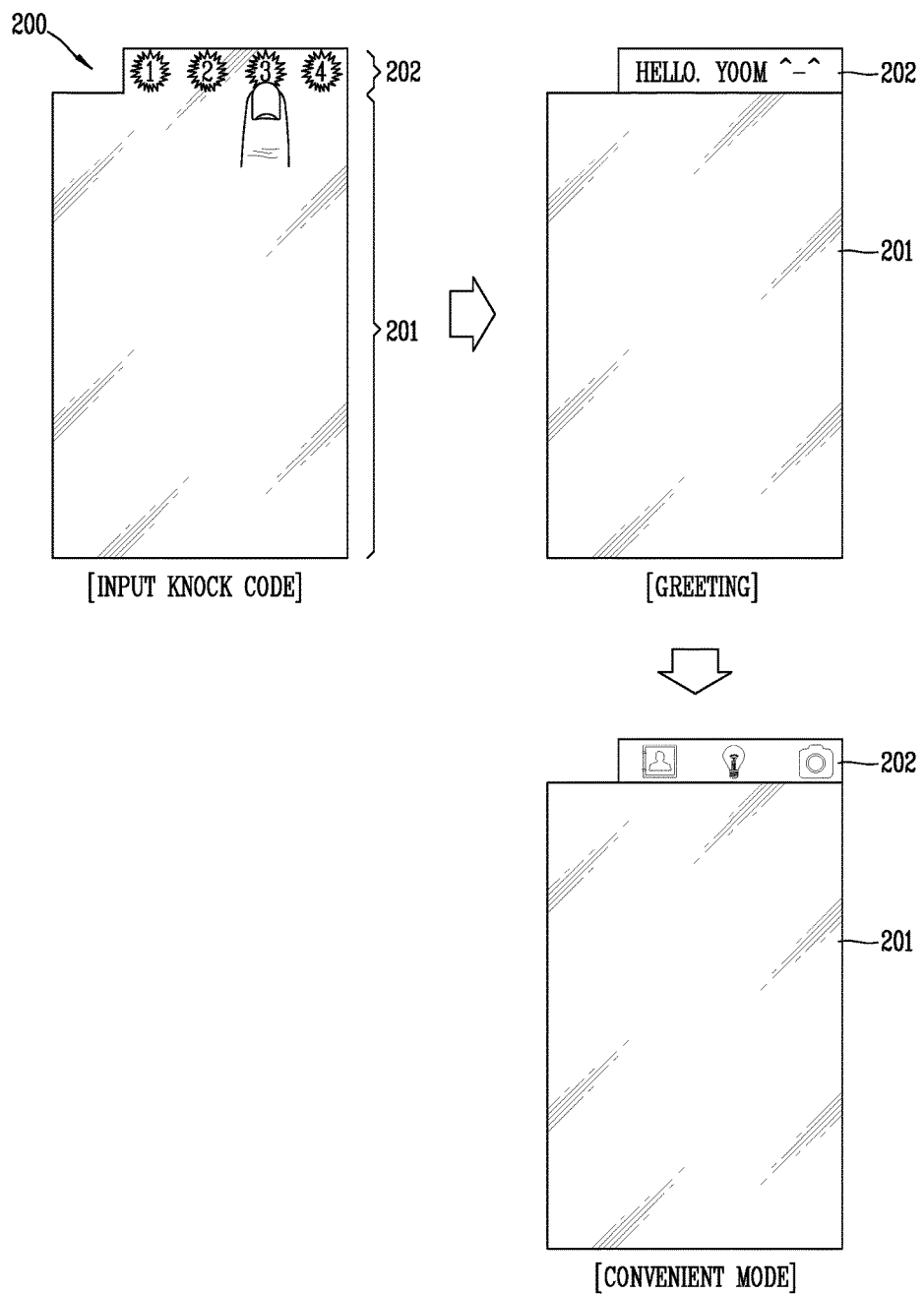
FIG. 10 is a view illustrating an embodiment to enter a convenient mode by activating an extended region according to an embodiment of the present invention.
Figure 11A:
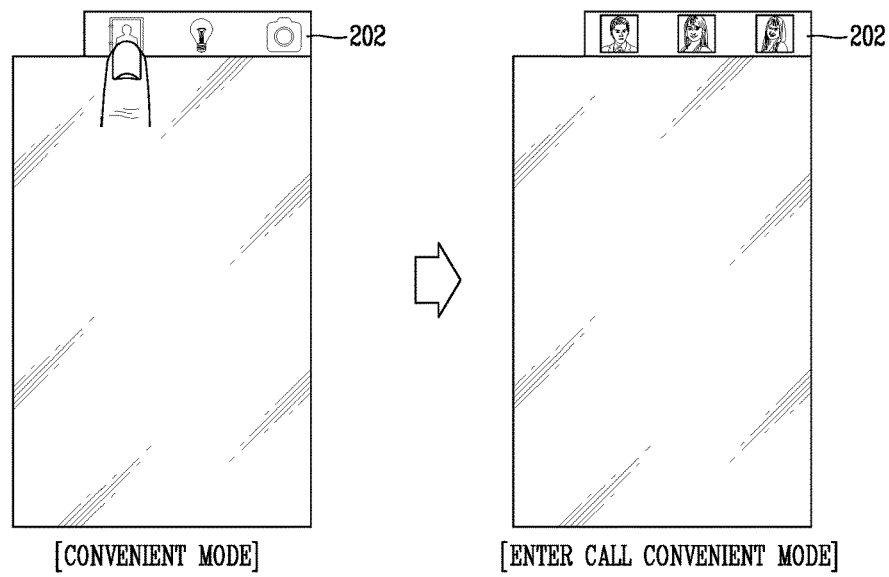
FIGS. 11A to 11C are views illustrating an embodiment to enter a user's selection mode in a convenient mode.
Figure 11B:
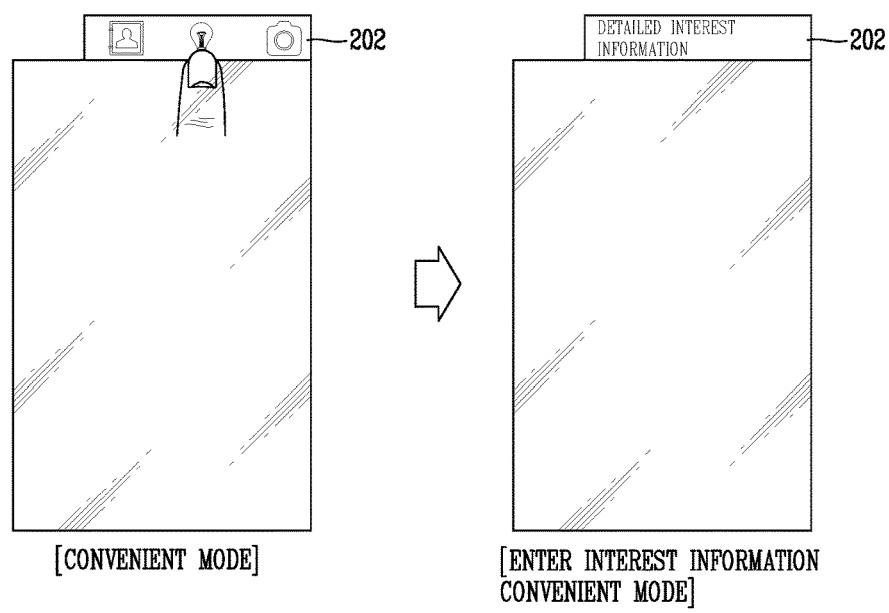
Figure 11C:
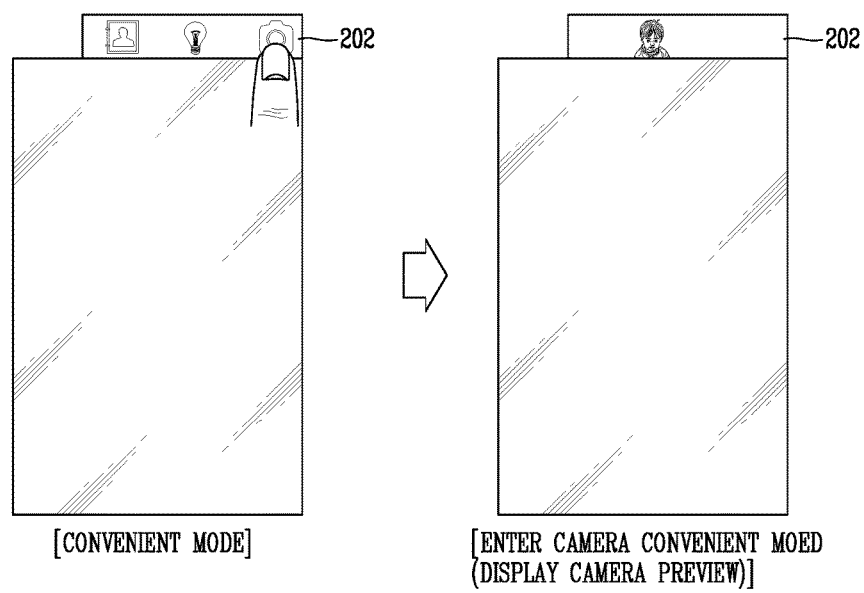

Next, FIG. 10 is a view illustrating an embodiment to enter a convenient mode by activating the extended region according to an embodiment of the present invention, and FIGS. 11A to 11C are views illustrating an embodiment to enter a user's selection mode in a convenient mode. Referring to FIG. 10, if a user inputs a knock code for entering a convenient mode to the extended region 202, the controller 180 activates the extended region and releases a locked state. If the locked state is released, the controller 180 displays a simple greeting on the extended region 202, and enters a convenient mode after a predetermined time (e.g., about 3 seconds) has lapsed.

Then, the controller 180 displays, on the extended region 202, one or more convenient mode items selectable by a user, in the form of an icon(s). For instance, the convenient mode icon may include an interest information icon and a camera icon. The greeting may be always displayed or may not be displayed according to a user's setting. A user can enter a desired detailed convenient mode by selecting one of the icons displayed on the extended region 202.

For instance, as shown in FIGS. 11A to 11C, a user can select one of a call icon, an interest information icon and a camera icon displayed on the extended region 202, thereby originating a call to another user, checking detailed interest information, or capturing an image (or check of a photo). If a knock code input to the extended region 202 by a user is not consistent with the knock code for entering a convenient mode, the controller 180 can display a guide message requiring re-input of a knock code, on the extended region 202.

As another example, a user can immediately enter a desired detailed convenient mode (or function) without selecting a convenient mode item, by inputting a shortcut knock code to the extended region 202. A knock code corresponding to the detailed convenient mode is pre-stored in the memory 170. Whenever a knock code is input, the input knock code is compared with the pre-stored knock code. If the two knock codes are consistent with each other, the mobile terminal enters a detailed convenient mode corresponding to the knock code.

Figure 12:
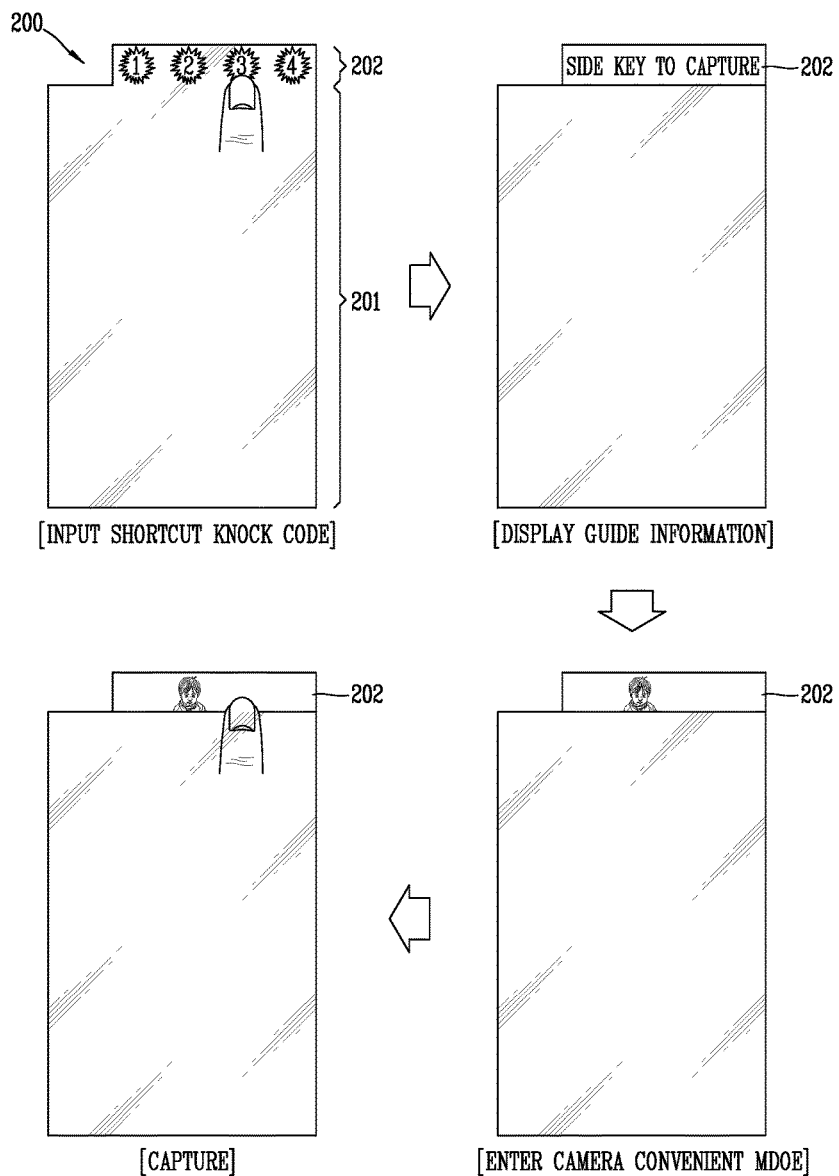
FIG. 12 is a view illustrating an embodiment to enter a convenient mode by inputting a shortcut knock code to an extended region.

FIG. 12 is a view illustrating an embodiment to enter a detailed convenient mode by inputting a shortcut knock code to the extended region. As shown in FIG. 12, once a user inputs a shortcut knock code to the extended region 202, the controller 180 can compare the input shortcut knock code with a pre-stored knock code, to thus enter a camera convenient mode.

In this instance, the controller 180 can display guide information on the extended region 202 for a predetermined time. The guide information, information indicating start of image-capturing, may be "tap or side key to capture." The guide information may not be displayed according to a user's setting, and may be set not to be displayed any longer after it has been firstly displayed.

If a user has erroneously input a shortcut knock code, the controller 180 can display a guide message requiring re-input of a shortcut knock code, on the extended region 202. Once the mobile terminal enters a camera convenient mode, the controller 180 displays a preview image of an object, on the extended region 202. If a user touches the extended region 202 based on guide information or indicates image-capturing by pressing a side key, the controller 180 outputs a shutter sound through the audio output unit 152, and displays an image captured by the camera 121 on the extended region 202.

Figure 13A:
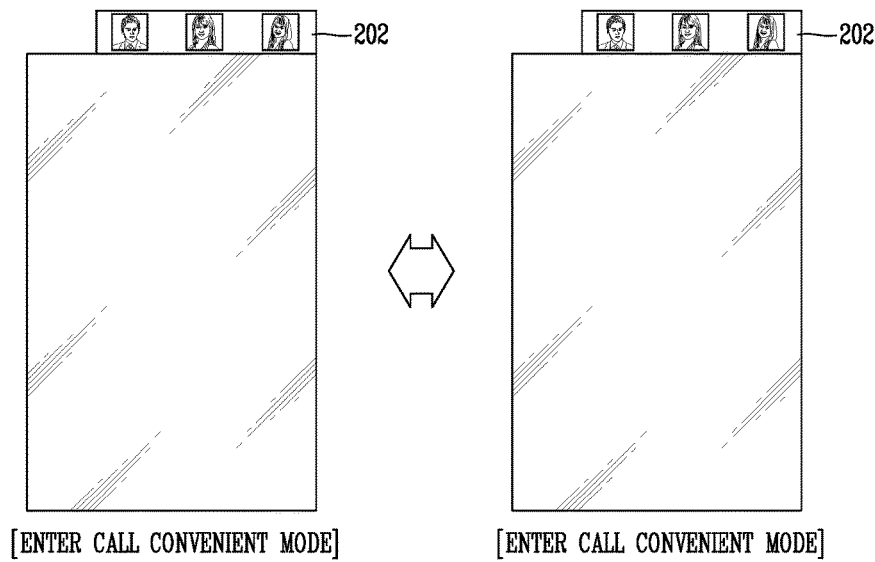
FIGS. 13A and 13B are views illustrating an embodiment to execute a related operation through an extended region, in a call convenient mode.
Figure 13B:
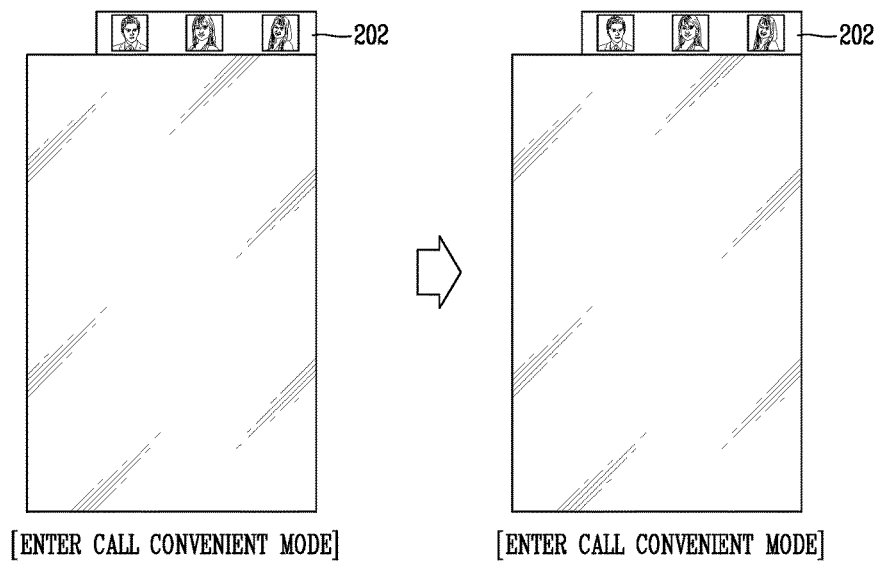

In the present invention, information displayed on the extended region 202 can be moved, selected and viewed in a detailed manner, in a convenient mode. FIGS. 13A and 13B are views illustrating an embodiment to execute a related operation on the extended region, in a call convenient mode. As shown in FIG. 13A, if one of a plurality of contact numbers (or photos) displayed on the extended region 202 is selected in a call convenient mode, the controller 180 displays detailed information of the selected contact number. If a call originating button is selected, the controller 180 originates a call to a corresponding user. Upon completion of a telephone dialogue, the controller 180 returns to a call convenient mode screen.

As shown in FIG. 13B, if the plurality of contact numbers (or photos) displayed on the extended region 202 are dragged in a horizontal direction (right and left), the controller 180 displays another contact number by moving a corresponding contact number, based on a dragged distance and intensity.

Figure 14:
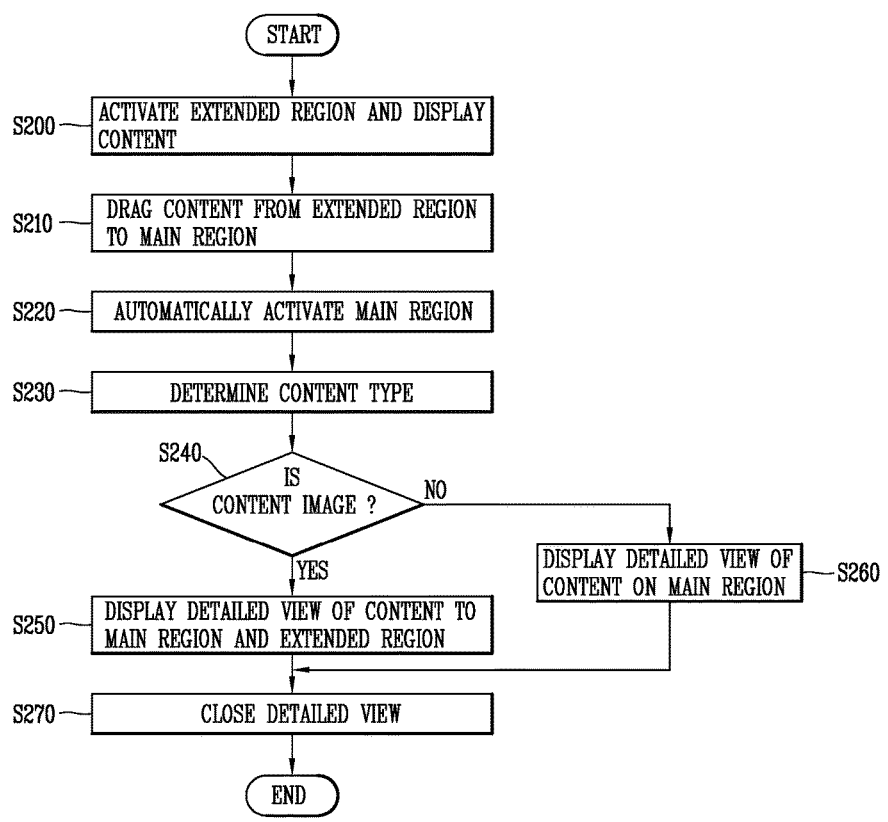
FIG. 14 is a flowchart illustrating processes of searching and checking convenient mode information through an extended region, in a mobile terminal according to an embodiment of the present invention.

FIG. 14 is a flowchart illustrating processes of searching and checking convenient mode information on the extended region, in the mobile terminal according to an embodiment of the present invention. Referring to FIG. 14, in a convenient mode, the main region 201 is deactivated and the extended region 202 is activated. Predetermined content, e.g., contact numbers, texts or preview images may be displayed on the activated extended region 202, as convenient mode information (S200).

A user can drag content displayed on the extended region 202 to the main region 201, or may scroll the content within the extended region 202 (S200). If the content displayed on the extended region 202 is dragged to the main region 201 (S210), the controller 180 automatically activates the main region 201, and then determines a type of the content (S220, S230).

If the content is determined as an image, the controller 180 displays a detailed view of the image on both the main region 201 and the extended region 202 (S250). On the contrary, if the content is determined as a simple text, the controller 180 displays the content on the extended region 202, and displays a detailed view of the content on the main region 201 (S260). Then, if a user upward-drags a bezel portion disposed at a lower end of the main region 201, the controller 180 controls the detailed view to disappear, and controls the mobile terminal to return to the previous state (S270).

Figure 15:
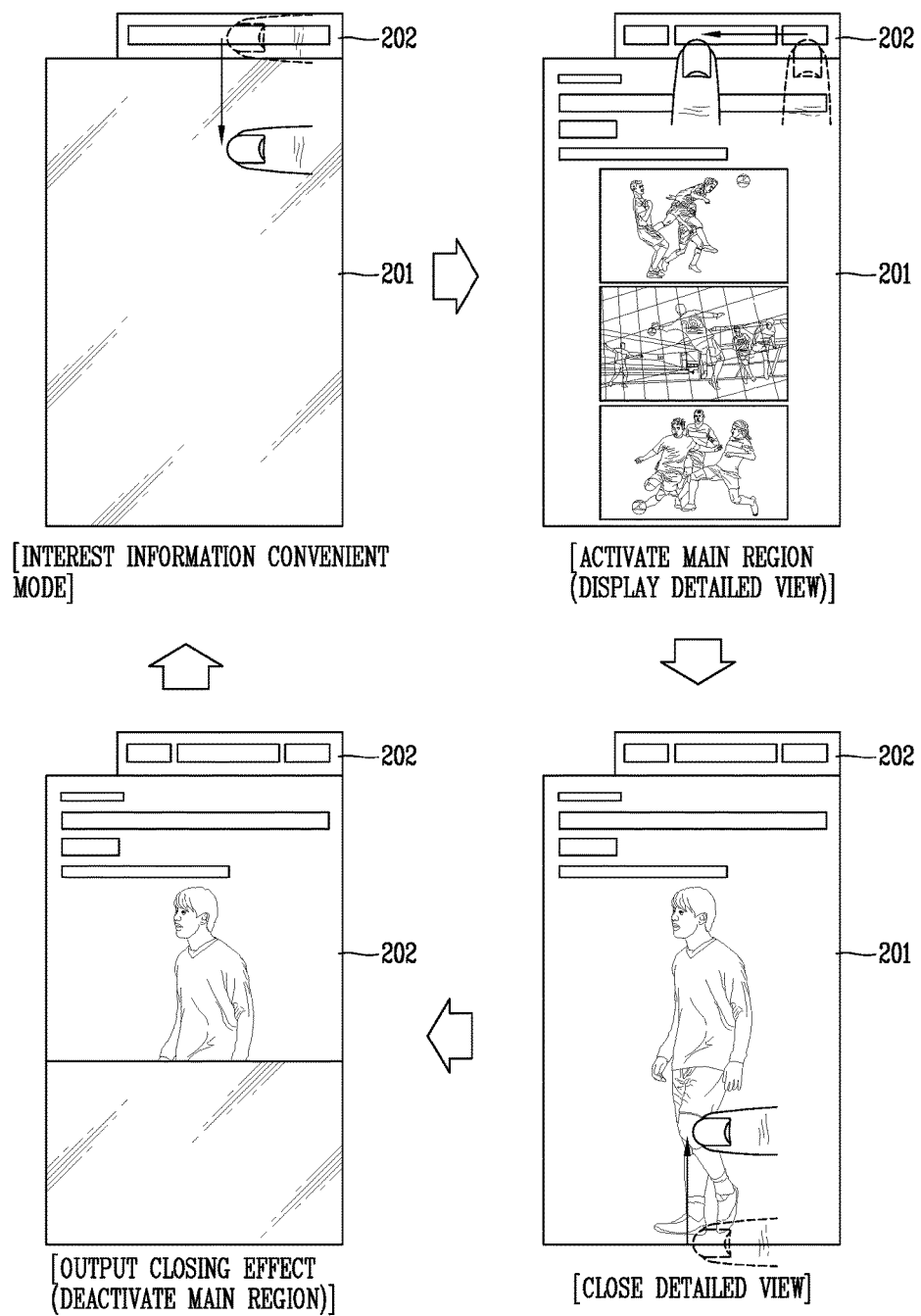
FIG. 15 is a view illustrating an embodiment to search and check interest information through an extended region, in an interest information convenient mode according to an embodiment of the present invention.

FIG. 15 is a view illustrating an embodiment to search and check interest information (glance view) through the extended region, in an interest information convenient mode according to an embodiment of the present invention. Once the mobile terminal enters an interest information convenient mode, the controller 180 displays interest information on the extended region 202.

Types of the interest information may be displayed according to a popularity order (ranking), or according to a user's setting. The interest information may be moved to another information by a user's drag in a horizontal direction (right and left), or may be automatically moved at predetermined time intervals.

A user can check detailed information of the interest information displayed on the extended region 202, on the main region 201, by dragging the interest information in a vertical direction (or toward the main region). That is, if the user drags the interest information to the main region 201 and then opens a detailed view, the controller 180 activates the main region 201, and displays detailed information of the interest information being currently displayed on the extended region 202, on the main region 201 in another form. The detailed information includes at least one of text information, image information, and video information. Said another form means a changed attribute of content, which may include enlargement/contraction, a shape change, etc. of a text or an image.

While the detailed information of the interest information is being displayed on the main region 201, the information displayed on the extended region 202 is scrolled to be changed at predetermined time intervals. If the user touches other interest information on the extended region 202 or drags said another interest information to the main region 201, the controller 180 changes the previous detailed information which was being displayed on the main region 201, into detailed information of the currently-selected interest information.

The user can search for other interest information by selecting a headline button and a menu button on the main region 201, or may execute a detailed operation such as saving. After checking the detailed view of the interest information, the user can upward-drag (or flick) the bezel portion disposed at a lower end of the main region 201, thereby closing the detailed view. The controller 180 gradually closes the detailed view while outputting a closing effect in visual and audible manners, according to a drag input of the user. And the controller 180 turns off the LCD of the main region 201 according to a size of the detailed view being closed. If the detailed view is completely closed, the controller 180 turns off the main region 201.

Figure 16:
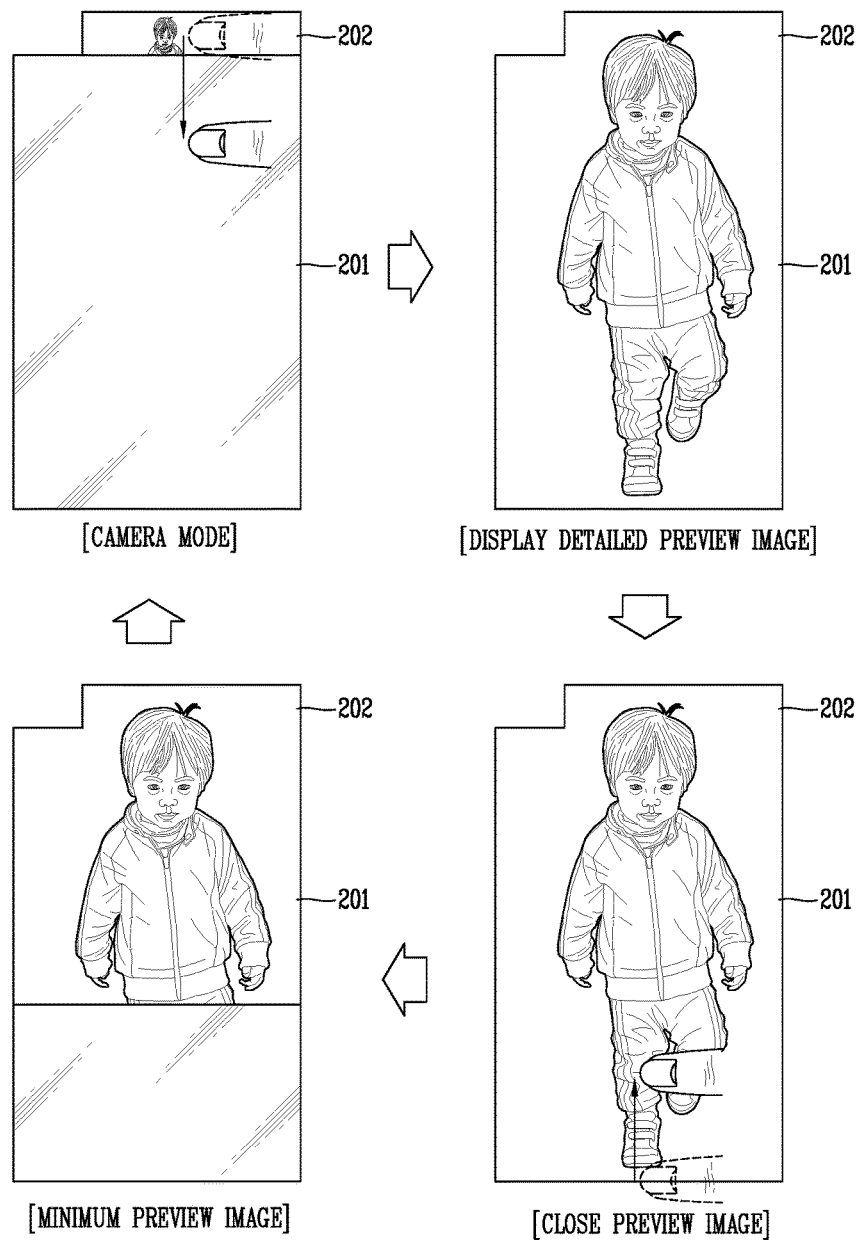
FIG. 16 is a view illustrating an embodiment to check a preview image in a camera convenient mode according to an embodiment of the present invention.

FIG. 16 is a view illustrating an embodiment to check a preview image in a camera convenient mode according to an embodiment of the present invention. As aforementioned, when the mobile terminal enters a camera convenient mode, a user guide is displayed on the extended region 202, and then a preview image is displayed on the extended region 202. A user can capture a subject by touching the preview image or by pressing a side key. When the subject is captured, visual and audible effects (or feedback effects) are provided.

Like in FIG. 15, the user can view a detailed preview image by dragging the preview image displayed on the extended region 202, to the main region 201. That is, if the user drags the preview image displayed on the extended region 202 to the main region 201, the controller 180 activates the main region 201, and displays a detailed view of the preview image displayed on the extended region 202 on the main region and the extended region. The detailed view indicates an image obtained as an attribute of a preview image is changed. For instance, the detailed view may be an image enlarged by a predetermined ratio.

The user can capture a subject by touching the preview image or by pressing a side key. When the preview image is displayed on the main region 201 and the extended region 202, the user can control a size of the preview image by upward-dragging the bezel portion disposed on a lower end of the main region 201. And the mobile terminal may return to the previous state where the preview is displayed only on the extended region 202, as the user upward-flicks the bezel portion. Once the previous state is restored, the controller 180 deactivates the main region 201 by turning off the LCD.

The above operation is not limited to check of a preview image, but may be equally applied to check of a captured image. That is, a captured image may be displayed on the extended region 202, and the captured image may be dragged to the main region 201 in order to be viewed in an enlarged manner.

Figure 17:
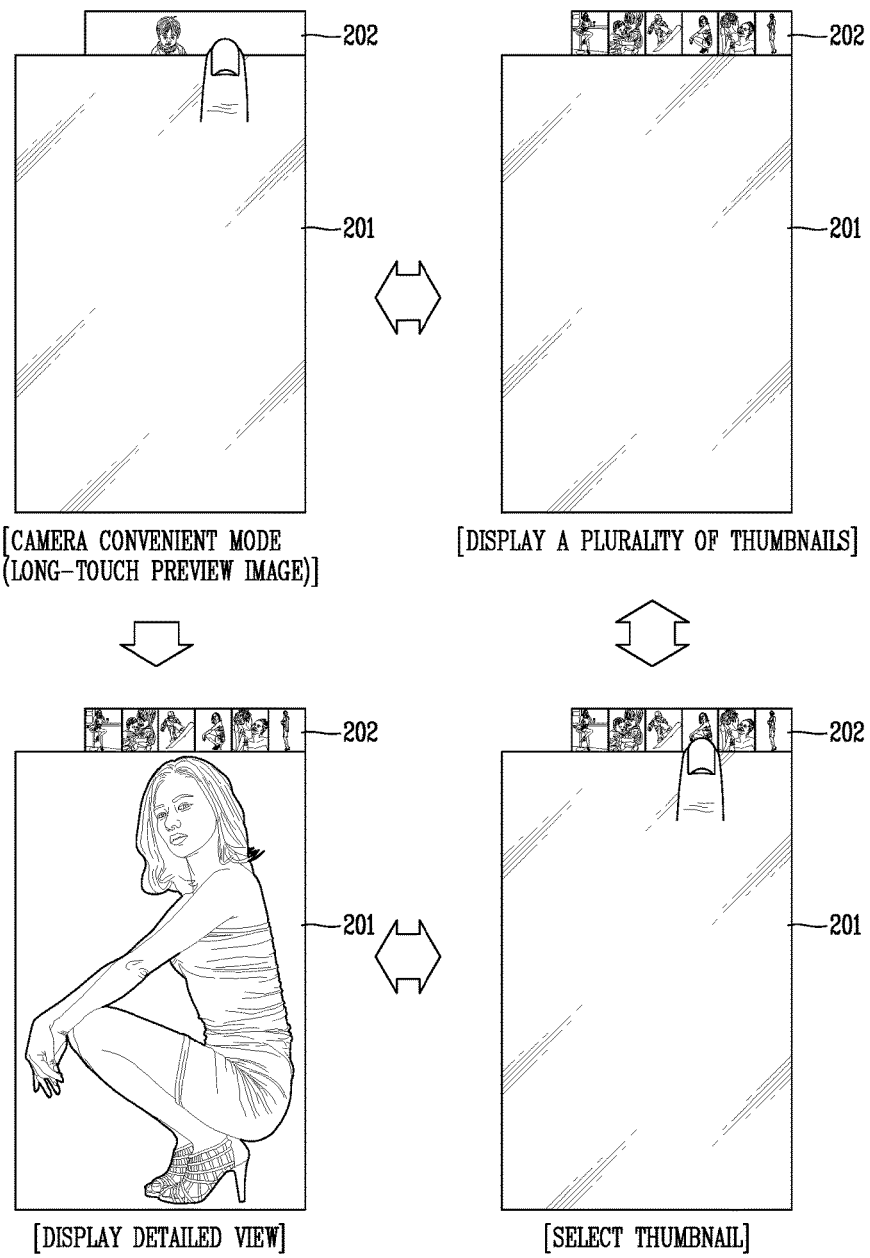
FIG. 17 is a view illustrating an embodiment to search for an image captured in a camera convenient mode.

FIG. 17 is a view illustrating an embodiment to search for an image captured in a camera convenient mode. As shown in FIG. 17, once the mobile terminal enters a camera convenient mode, a preview image is displayed on the extended region 202. If the preview image is long-touched, the controller 180 searches for a plurality of photos which have been previously captured in a camera convenient mode, in a gallery. Then, the controller 180 displays the searched photos on the extended region 202 in the form of a thumbnail.

If a specific thumbnail is selected, the controller 180 activates the main region 201, and then displays a detailed view of the selected thumbnail on the main region 202. A user can close the detailed view by upward-flicking the bezel portion disposed at a lower end of the main region 201. If the detailed view is closed, the controller 180 controls the mobile terminal to return to the previous state where the preview image has been displayed.

If input of a side key is sensed in the previous state, the mobile terminal returns to the initial state where the preview image has been displayed. Thus, the user can continuously capture an image while viewing the preview image (screen). If the user presses the side key in the initial state, the controller 180 displays a detailed view of a thumbnail which has been displayed lastly, on the main region 201.

Figure 18:
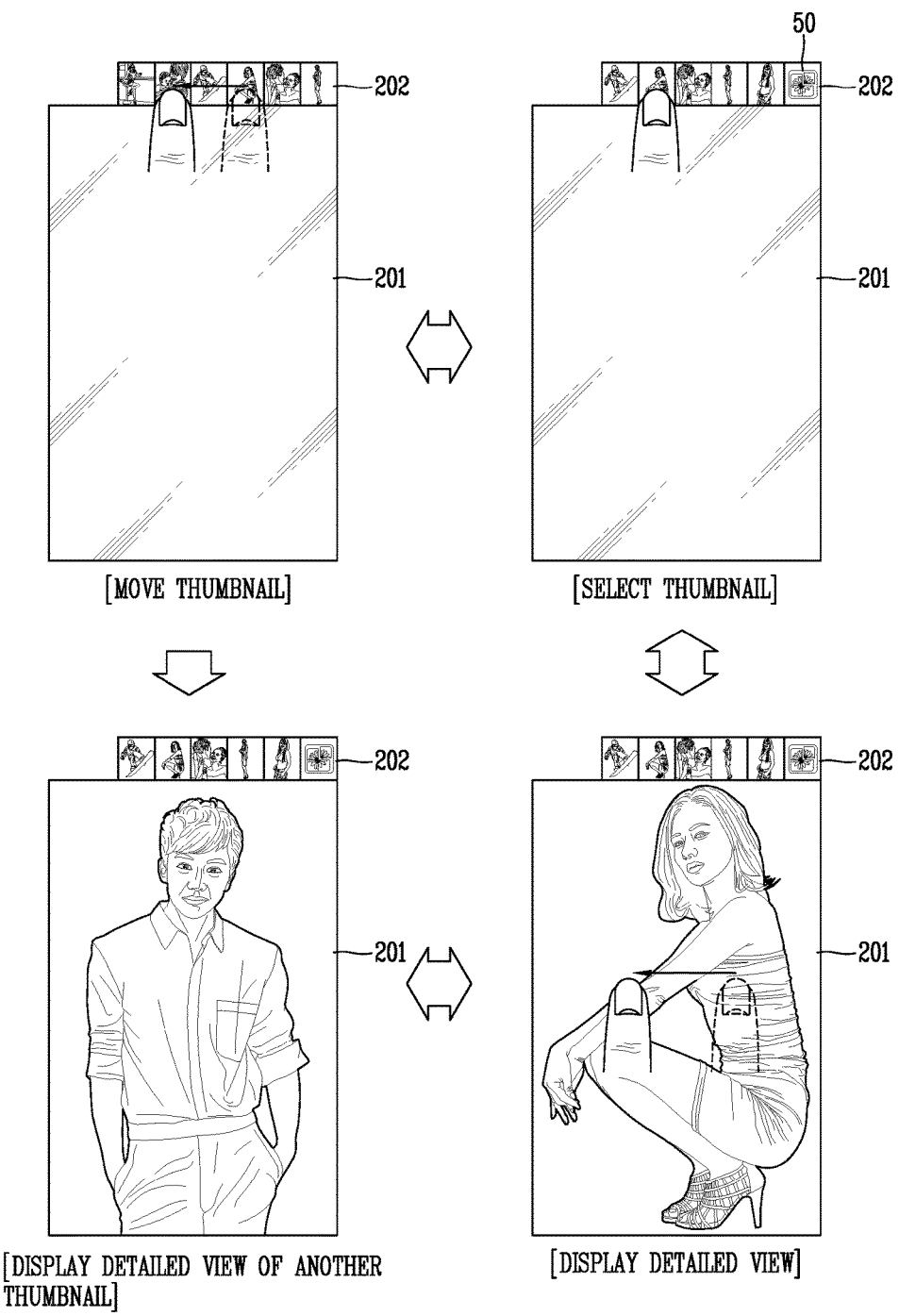
FIG. 18 is a view illustrating another embodiment to search for an image captured in a camera convenient mode.

FIG. 18 is a view illustrating another embodiment to search for an image captured in a camera convenient mode. If a plurality of thumbnails displayed on the extended region 202 are dragged right and left, the controller 180 moves the thumbnails according to a drag direction and drag intensity, and displays a gallery icon 50 next to the last thumbnail. A user can search for a desired photo on the extended region 202.

If a specific thumbnail is selected, the controller 180 activates the main region 201, and then displays a detailed view of the selected thumbnail on the main region 201, as aforementioned. In the displayed state of the detailed view, the user can view a detailed view of the next or previous thumbnail, by dragging the detailed view right and left. Subsequent operations to close the detailed view and to return to the previous state are the same as those in FIG. 17, and thus detailed explanations thereof will be omitted.

Figure 19:
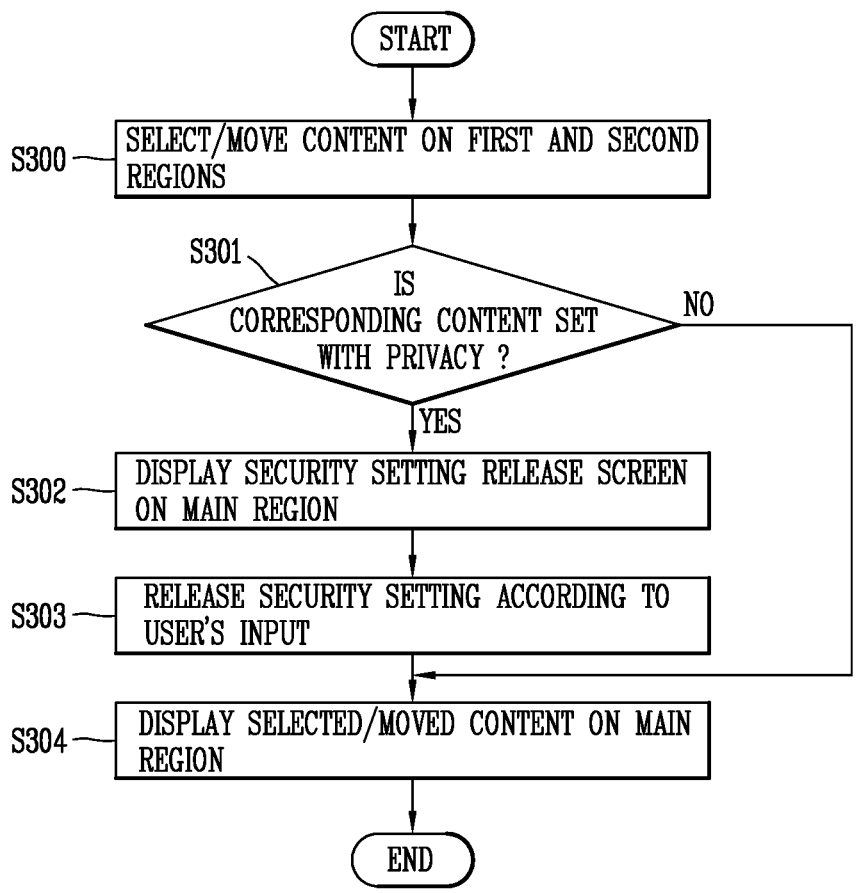
FIG. 19 is a flowchart illustrating a method for displaying an image captured in a camera convenient mode, based on a privacy setting.

FIG. 19 is a flowchart illustrating a method for displaying an image captured in a camera convenient mode, based on a privacy setting. As shown in FIG. 19, if predetermined content (e.g., text or image) is selected from the extended region 202 or movement between contents occurs on the main region 201 (S300), the controller 180 checks whether privacy has been set to the content (S301).

For instance, content to which privacy has not been set is information which has been already publicized, which may include news, weather, stocks and a search result on publicized information. On the contrary, content to which privacy has been set may include information uploaded to an SNS (SNS account), photos in a gallery, memos, etc.

If corresponding content has been set with privacy, the controller 180 displays a security setting release screen on the main region 201 (S302), and releases a security setting according to information input by a user (S303). The security setting release screen may be a knock code input screen. Further, if the corresponding content has not been set with privacy, the controller 180 displays selected or moved content on the main region 201 as shown in FIGS. 15 to 18.

Figure 20A:
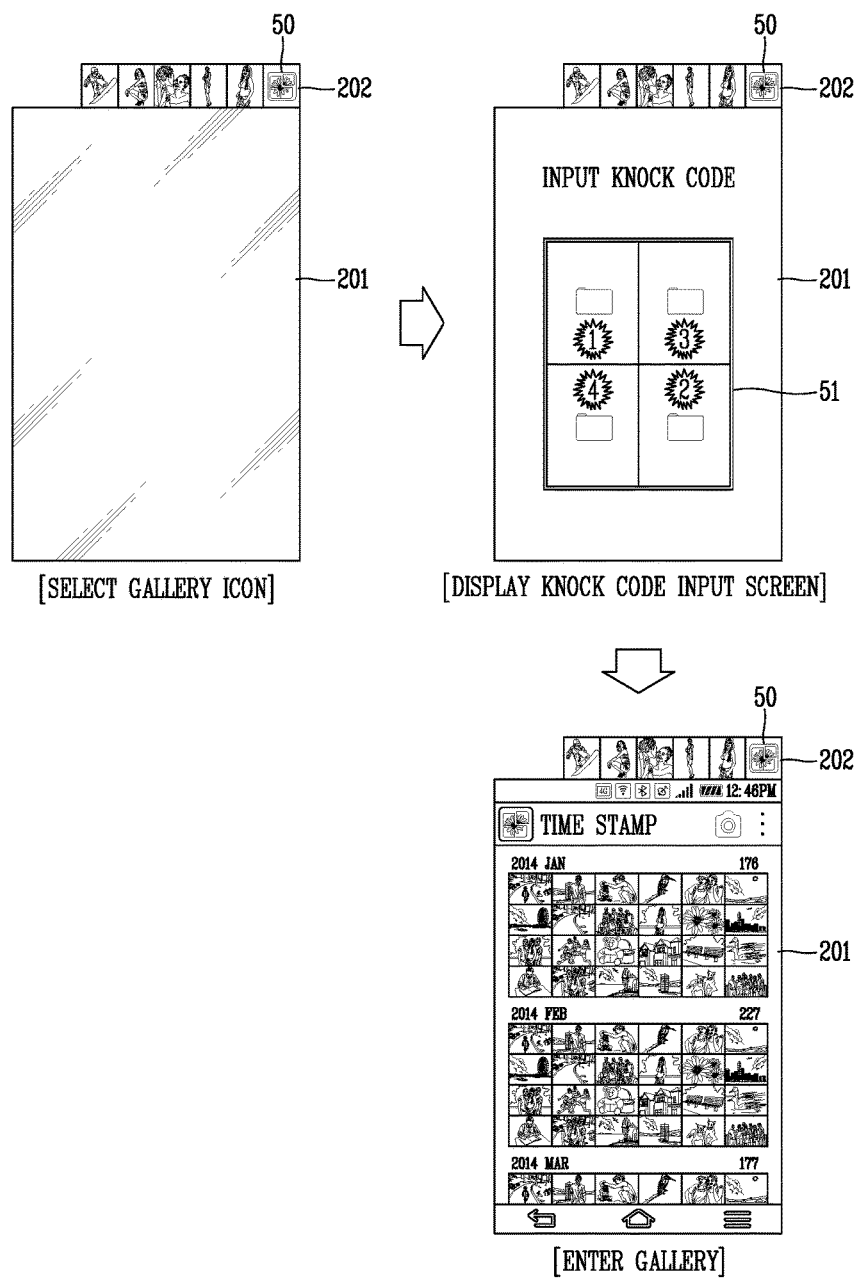

FIGS. 20A and 20B are views illustrating an embodiment to search for content set with privacy information according to an embodiment of the present invention. As aforementioned, a thumbnail list displayed on the extended region 202 of the display unit 200 may include a gallery icon 50 for entering a gallery. The gallery includes photos set with privacy.

Once a specific photo set with privacy or the gallery icon is selected on the extended region 202, the controller 180 displays a guide indicating release of a security setting, on the main region 201. The guide may be a text, or may be a knock code input screen 51 as shown in FIG. 20A. If a user inputs a predetermined knock code to the knock code input screen 51, the controller 180 releases a security setting, and then displays a detailed view of a specific photo or a plurality of photos stored in the gallery, on the main region 201.

As shown in FIG. 20B, if the user presses a home key in a state where detailed interest information has been displayed on the main region 201, the controller 180 displays, on the main region 201, a guide indicating release of a security setting set to a home screen. The guide may be the knock code input screen 51. Thus, if the user inputs a preset knock code to the knock code input screen 51, the controller 180 releases the security setting, and displays the home screen on the main region 201.

Figure 21:
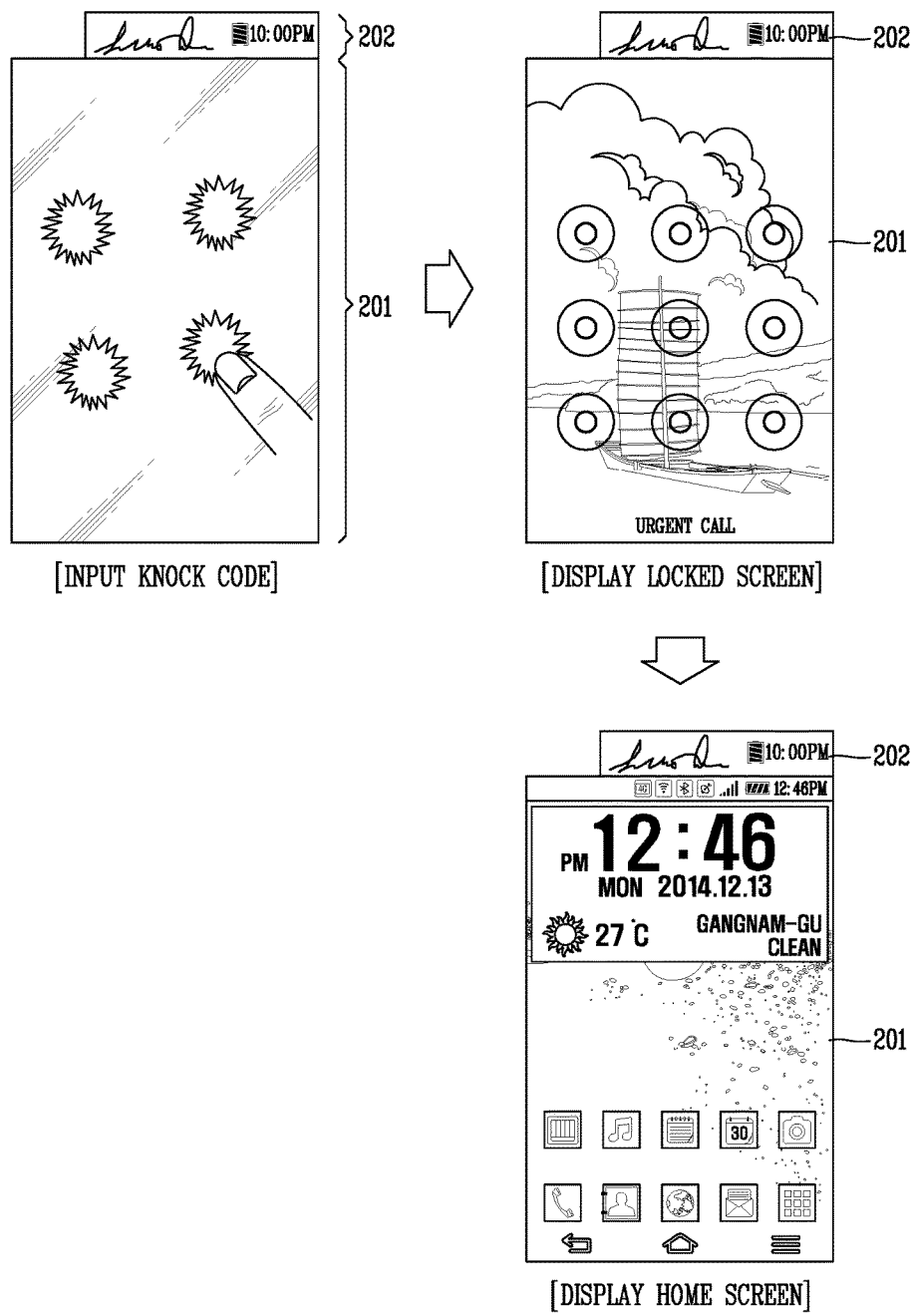
FIG. 21 is a view illustrating an embodiment to enter a general mode, by inputting a knock code to a main region according to an embodiment of the present invention.

FIG. 21 is a view illustrating an embodiment to enter a general mode, by inputting a knock code to the main region according to an embodiment of the present invention. As shown in FIG. 21, when the display unit 200 is in a deactivated state, the main region 201 may be turned off, and the extended region 202 may maintain an ambient state.

The reason is because the LCDs of the main region and the extended region may be driven independently. The ambient state is a state where power consumption of a battery is minimized, and only information having a minimum combination is displayed in the state. Information provided in the ambient state is at least one of a date, weather, a battery remaining amount, a time, a user's signature and a background (BG) image, or a combination thereof.

A user can activate the extended region 202 by inputting a preset knock code to the main region 201. Once the extended region 202 is activated, the controller 180 displays a home screen. If the home screen is set with a security, the controller 180 displays a locked screen. If a locked state of the locked screen is released by an input password, the controller 180 displays the home screen.

FIGS. 22A and 22B are views illustrating an embodiment to display information related to an application executed on the main screen, on the supplementary screen. As shown in FIG. 22A, a user can display a home screen on the main region 201 in a general mode. In this instance, the extended region 202 maintains an ambient state.

If the user executes a specific application (e.g., a calendar application) on the home screen, the controller 180 displays schedules of the user corresponding to a predetermined time period, and highlights today's schedule 60 (January 7). In this state, if the user activates the extended region 202 by inputting a knock code, the controller 180 displays not only today's detailed schedule, but also a notification about a next schedule (January 13), on the extended region 202.

In another embodiment, if the user activates the extended region 202 by inputting a knock code after executing a finger authentication process, the controller 180 displays a privacy-set secret schedule of the user, on the extended region 202, as shown in FIG. 22B. Such operations are equally executed even when another application is executed on the main region 201.

FIG. 23 is a flowchart illustrating an operation to enter a helper mode by activating the main region and the extended region, through combination of knock codes. As shown in FIG. 23, in a deactivated state of the display unit 200 (S430), if the main region 201 and the extended region 202 are touched with a predetermined pattern, the controller 180 detects a combined knock code formed by the touch, and compares the detected knock code with a preset knock code (S301).

If the detected knock code is consistent with a preset knock code as a comparison result, the controller 180 activates both the main region 201 and the extended region 202 (S302). In the present invention, a mode where both the main region 201 and the extended region 202 are activated through combination of knock codes, is defined as a helper mode.

Once the main region 201 and the extended region 202 are activated through combination of knock codes, the controller 180 displays information on the extended region 202 according to a state of the main region 201 (S303). Then, if a predetermined application is executed on the main region 201 (S304), the controller 180 can display a tip or guide about the predetermined application, on the extended region 202 (S305). And the controller 180 can display a notification about event-related information (call, message), on the extended region 202.

FIG. 24 is a view illustrating an embodiment to provide information to the extended region, based on a state of the main region in a helper mode. As shown in FIG. 24, if a combined knock code is input to the main region 201 and the extended region 202, the controller 180 enters a helper mode by activating both the main region 201 and the extended region 202.

Once the mobile terminal enters the helper mode, the controller 180 displays a home screen on the main region. If the home screen is set with security, a locked screen is displayed on the main region 201. A minimum number of applications and time information may be displayed on the locked screen, and information for the locked screen only (i.e., weather information) is displayed on the extended screen.

Upon release of the locked screen, the controller 180 displays the home screen on the main region 201, and displays information for the home screen only (e.g., news, stock information, or event information such as call reception or message reception) on the extended region 202.

FIGS. 25A to 25D are views illustrating an embodiment to provide information to the extended region, according to an application executed on the main region in a helper mode. Information displayed on the extended region 202 in a helper mode may be additional information or guide information about an application being executed on the main region 201.

Figure 25B:
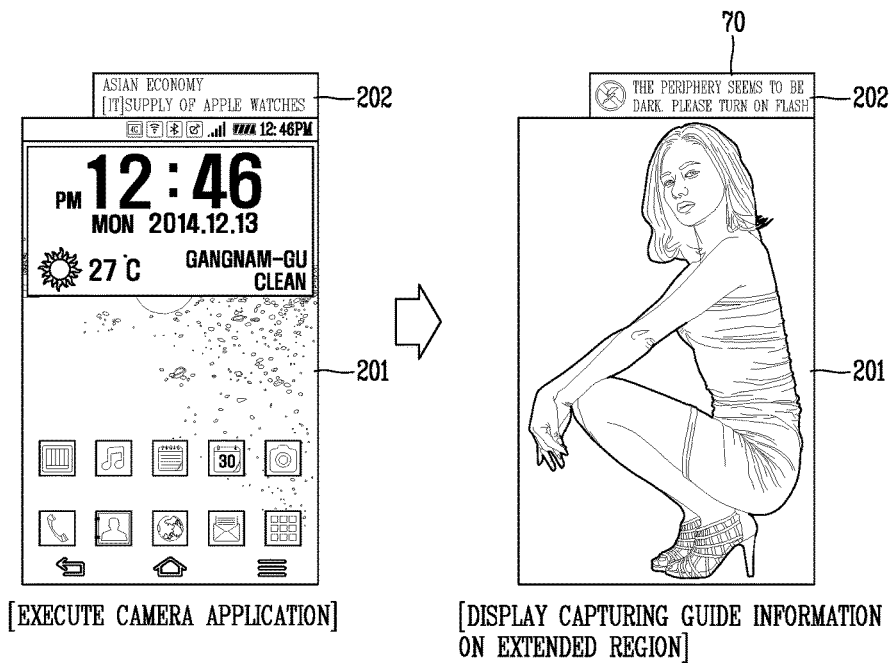

For instance, as shown in FIG. 25A, if a calendar application is selected from a home screen displayed on the main region 201, the controller 180 can display a next schedule on the extended region 202. As another example, as shown in FIG. 25B, if a camera application (or function) is selected from the home screen displayed on the main region 201, the controller 180 can display a preview image on the main region 201, and may display guide information related to capturing on the extended region 202. For instance, the guide information may be a message inducing an operation of a flash.

Figure 25C:
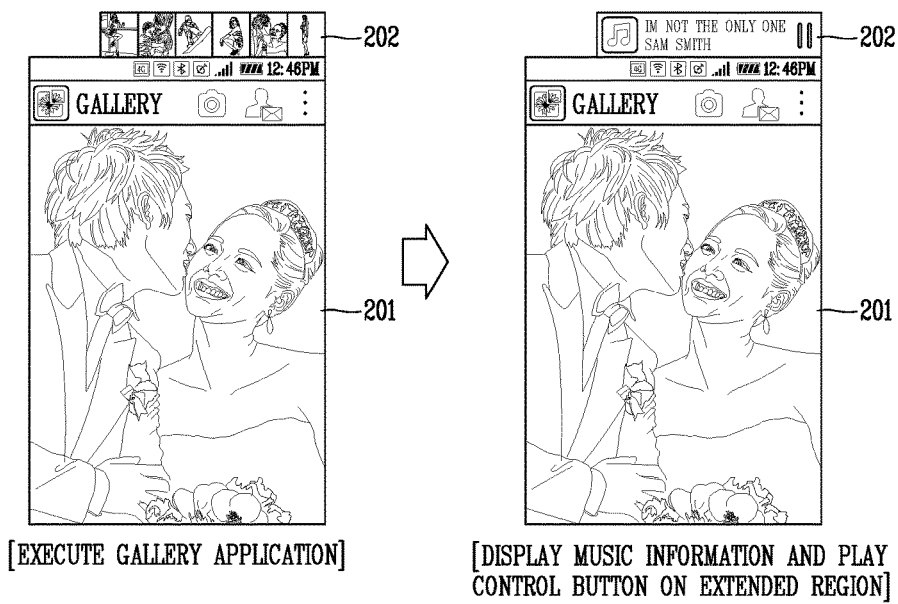

As shown in FIG. 25C, if a user views a photo on the main region 201 by executing a gallery application, one or more photos captured on the same date may be displayed on the extended region 202. In this state, if the user plays music as a background, the controller 180 can display, on the extended region 202, information related to the music being currently played (e.g., title, singer) and a play control button (stop button, fast-forward button, rewind button).

Figure 25D:
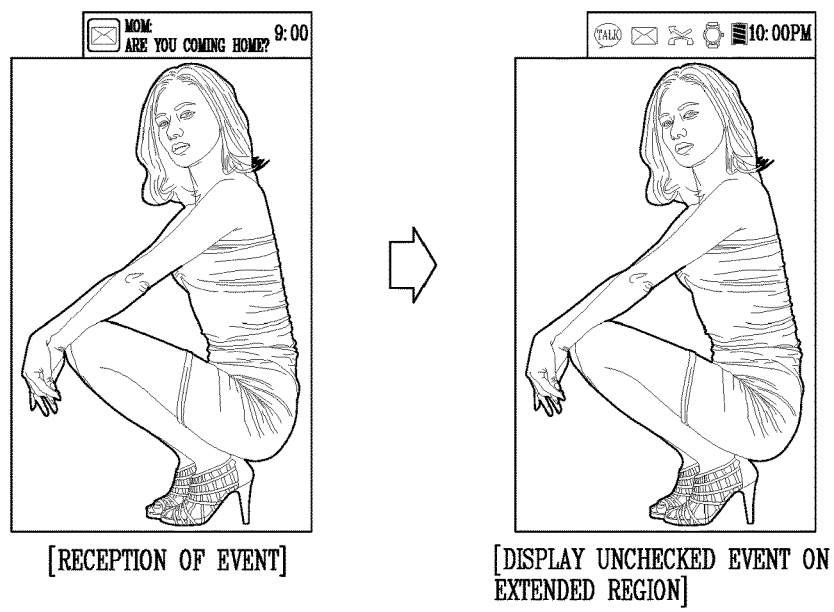

As shown in FIG. 25D, if an event (e.g., reception of a call or a message) occurs in a helper mode, the controller 180 notifies the occurrence of the event on the extended region 202, together with content of the event. If the user does not check the event, the controller 180 displays the unchecked event on the extended region 202.

Figure 26:
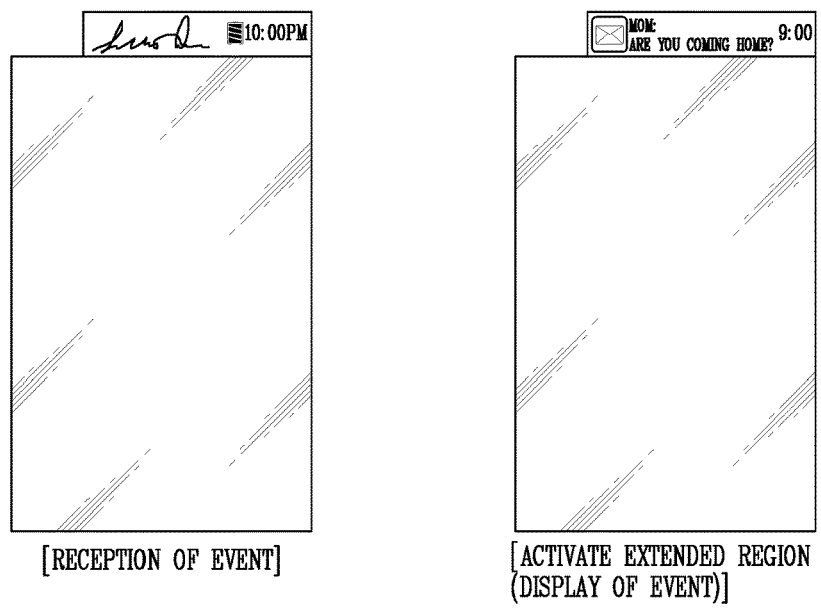
FIG. 26 is a view illustrating another embodiment to activate an extended region when a display unit is in a deactivated state.

FIG. 26 is a view illustrating another embodiment to activate the extended region when the display unit is in a deactivated state according to an embodiment of the present invention. As shown in FIG. 26, when an event occurs, the controller 180 can automatically activate the extended region 202. Then, the controller may notify the occurrence of the event on the activated extended region 202, together with content of the event.

The present invention provides the following advantages. As aforementioned, in the present invention, the display unit is composed of the main region, and the extended region extended from the main region and having a different form from the main region. The main region and the extended region are selectively activated by using a knock code, such that schematic information, or additional information and guide information about an application being currently executed on the main region is displayed on the main region. This can reduce power consumption of a battery, and extend an information display region.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication processor configured to provide wireless communication;
a display including a main region and an extended region extended from the main region toward at least one side of the main region; and
a controller configured to:
deactivate the main region and the extended region of the display,
activate the main region of the display without activating the extended region in response to a knock code being input on the main region of the display, and
activate the extended region of the display without activating the main region in response to the knock code being input on extended region of the display,
wherein the controller is further configured to:
in response to a content displayed on the extended region being selected, display the content on the extended region, and display a detailed view on the main region,
in response to the content being dragged to the main region, determine a type of the content,
in response to the content displayed on the extended region being text, display the content on the extended region and display the detailed view on the main region, and
in response to the content displayed on the extended region being an image, display the detailed view on the extended region and the main region.

2. The mobile terminal of claim 1, wherein the knock code includes consecutive touch inputs within a reference time.

3. The mobile terminal of claim 1, wherein the controller is further configured to activate both the main region and the extended region of the display in response to the knock code being input on both the main region and the extended region of the display.

4. The mobile terminal of claim 1, wherein the extended region is different from the main region in size and shape.

5. The mobile terminal of claim 1, wherein said at least one side of the main region includes an upper side, a lower side, a right side and a left side of the main region, and a side surface, an upper surface or a bottom surface of the mobile terminal.

6. The mobile terminal of claim 1, wherein the controller is further configured to:
maintain the extended region in an ambient state when the display is deactivated, and
display at least one of a date, weather, a battery remaining amount, a time, a user's signature and a background image or a combination thereof in the extended region in the ambient state.

7. The mobile terminal of claim 1, wherein the controller is further configured to:
in response to an event occurring on the mobile terminal, automatically activate the extended region and display information about the event on the extended region.

8. The mobile terminal of claim 1, wherein the controller is further configured to display the content including at least one of contact numbers, camera previews, and interest information on the activated extended region based on a type of the input knock code.

9. The mobile terminal of claim 8, wherein the controller is further configured to display the content in response to selection of at least one convenient mode item provided when the knock code is input on the extended region, or when a shortcut knock code is input on the extended region.

10. The mobile terminal of claim 8, wherein in response to the content displayed on the extended region being selected and dragged to the main region, the controller is further configured to automatically activate the main region, and
wherein the content displayed on the extended region is scrollable, and the detailed view displays a changed attribute of content.

11. The mobile terminal of claim 1, wherein the controller is further configured to:
in response to a combined knock code being input on the main region and the extended region, activate both the main region and the extended region, and display related information on the extended region, based on a screen type of the main region or a type of an application executed on the main region.

12. The mobile terminal of claim 11, wherein the controller is further configured to:
display one of a locked screen or a home screen on the main region, and
display information for the corresponding locked screen or home screen only.

13. The mobile terminal of claim 11, wherein the controller is further configured to:
   execute a predetermined application on the main region, and
   display guide information and additional information about the application on the extended region.

14. A method of controlling a mobile terminal, the method comprising:
   deactivating, via a controller of the mobile terminal, a main region and an extended region of a display of the mobile terminal, the extended region extending from the main region toward at least one side of the main region;
   activating, via the controller, the main region of the display without activating the extended region in response to a knock code being input on the main region of the display; and
   activating, via the controller, the extended region of the display without activating the main region in response to the knock code being input on extended region of the display,
   wherein the method further comprises:
   in response to a content displayed on the extended region being selected, displaying, via the controller, the content on the extended region and a detailed view on the main region;
   in response to the content being dragged to the main region, determining via the controller, a type of the content;
   in response to the content displayed on the extended region being text, displaying, via the controller, the content on the extended region and the detailed view on the main region; and
   in response to the content displayed on the extended region being an image, displaying via the controller, the detailed view on the extended region and the main region.

15. The method of claim 14, wherein the knock code includes consecutive touch inputs within a reference time.

16. The method of claim 14, further comprising:
   activating, via the controller, both the main region and the extended region of the display in response to the knock code being input on both the main region and the extended region of the display.

17. The method of claim 14, wherein the extended region is different from the main region in size and shape.

18. The method of claim 14, wherein said at least one side of the main region includes an upper side, a lower side, a right side and a left side of the main region, and a side surface, an upper surface or a bottom surface of the mobile terminal.

19. The method of claim 14, further comprising:
   maintaining, via the controller, the extended region in an ambient state when the display is deactivated; and
   displaying at least one of a date, weather, a battery remaining amount, a time, a user's signature and a background image or a combination thereof in the extended region in the ambient state.

* * * * *